US010638155B2

United States Patent
Takeuchi et al.

(10) Patent No.: US 10,638,155 B2
(45) Date of Patent: Apr. 28, 2020

(54) APPARATUS FOR VIDEO ENCODING, APPARATUS FOR VIDEO DECODING, AND NON-TRANSITORY COMPUTER-READABLE STORAGE MEDIUM

(71) Applicant: FUJITSU LIMITED, Kawasaki-shi, Kanagawa (JP)

(72) Inventors: Kenshiro Takeuchi, Kawasaki (JP); Kimihiko Kazui, Kawasaki (JP); Satoshi Shimada, Kawasaki (JP); Hidenobu Miyoshi, Kawasaki (JP); Guillaume Denis Christian Barroux, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/837,065

(22) Filed: Dec. 11, 2017

(65) Prior Publication Data

US 2018/0184116 A1 Jun. 28, 2018

(30) Foreign Application Priority Data

Dec. 26, 2016 (JP) ................. 2016-250950

(51) Int. Cl.
*H04N 19/577* (2014.01)
*H04N 19/13* (2014.01)
(Continued)

(52) U.S. Cl.
CPC ......... *H04N 19/577* (2014.11); *H04N 19/109* (2014.11); *H04N 19/124* (2014.11);
(Continued)

(58) Field of Classification Search
CPC .. H04N 19/577; H04N 19/176; H04N 19/182; H04N 19/137; H04N 19/109; H04N 19/625; H04N 19/124; H04N 19/13
See application file for complete search history.

(56) References Cited

U.S. PATENT DOCUMENTS

2013/0121411 A1* 5/2013 Robillard .............. G10L 19/008
375/240.12
2013/0266069 A1 10/2013 Sugio et al.
(Continued)

FOREIGN PATENT DOCUMENTS

WO 2012/081246 6/2012

OTHER PUBLICATIONS

"Advanced video coding for generic audiovisual services", ITU-T Telecommunication Standardization Sector of ITU, Series H: Audiovisual and Multimedia Systems, Infrastructure of audiovisual services—Coding of moving video, Recommendation H.264, ISO/IEC 14496-10 (Oct. 2016) (804 pages).
(Continued)

*Primary Examiner* — Joseph Suh
(74) *Attorney, Agent, or Firm* — Fujitsu Patent Center

(57) ABSTRACT

An apparatus for a video encoding process executes a difference process for calculating a difference value between corresponding pixels of a first reference block on a first encoded reference picture in a first direction and a second reference block on a second encoded reference picture in a second direction; executes a predictive process for generating a predictive block by calculating a pixel value of the predictive block in accordance with the bi-predictive mode for each pixel in which an absolute value of the difference value is less than a threshold value, and by calculating the pixel value of the predictive block based on a value of the corresponding pixel of one of the first reference block and the second reference block for each pixel in which the absolute value of the difference value is the threshold value or more.

8 Claims, 13 Drawing Sheets

(51) Int. Cl.
*H04N 19/124* (2014.01)
*H04N 19/625* (2014.01)
*H04N 19/109* (2014.01)
*H04N 19/182* (2014.01)
*H04N 19/176* (2014.01)
*H04N 19/137* (2014.01)

(52) U.S. Cl.
CPC .......... *H04N 19/13* (2014.11); *H04N 19/137* (2014.11); *H04N 19/176* (2014.11); *H04N 19/182* (2014.11); *H04N 19/625* (2014.11)

(56) References Cited

U.S. PATENT DOCUMENTS

2015/0156501 A1* 6/2015 Hannuksela ........... H04N 19/70
375/240.12ke
2016/0323556 A1* 11/2016 Luginbuhl ............... H04N 9/67
2016/0366416 A1* 12/2016 Liu ........................ H04N 19/52
2017/0150144 A1* 5/2017 Chaudhari ........... H04N 19/115
2017/0171565 A1* 6/2017 Le Leannec ........... H04N 19/50
2017/0324973 A1* 11/2017 Tanner ................. H04N 19/176
2018/0054749 A1* 2/2018 Kim ................ H04W 36/00837
2018/0176574 A1* 6/2018 Tang .................... H04N 19/117
2018/0295385 A1* 10/2018 Alshin ................ H04N 19/176

OTHER PUBLICATIONS

"High efficiency video coding", ITU-T Telecommunication Standardization Sector of ITU, Series H: Audiovisual and Multimedia Systems, Infrastructure of audiovisual services—Coding of moving video. Recommendation H.265, ISO/IEC 23008-2 (Apr. 2015) (634 pages).

* cited by examiner

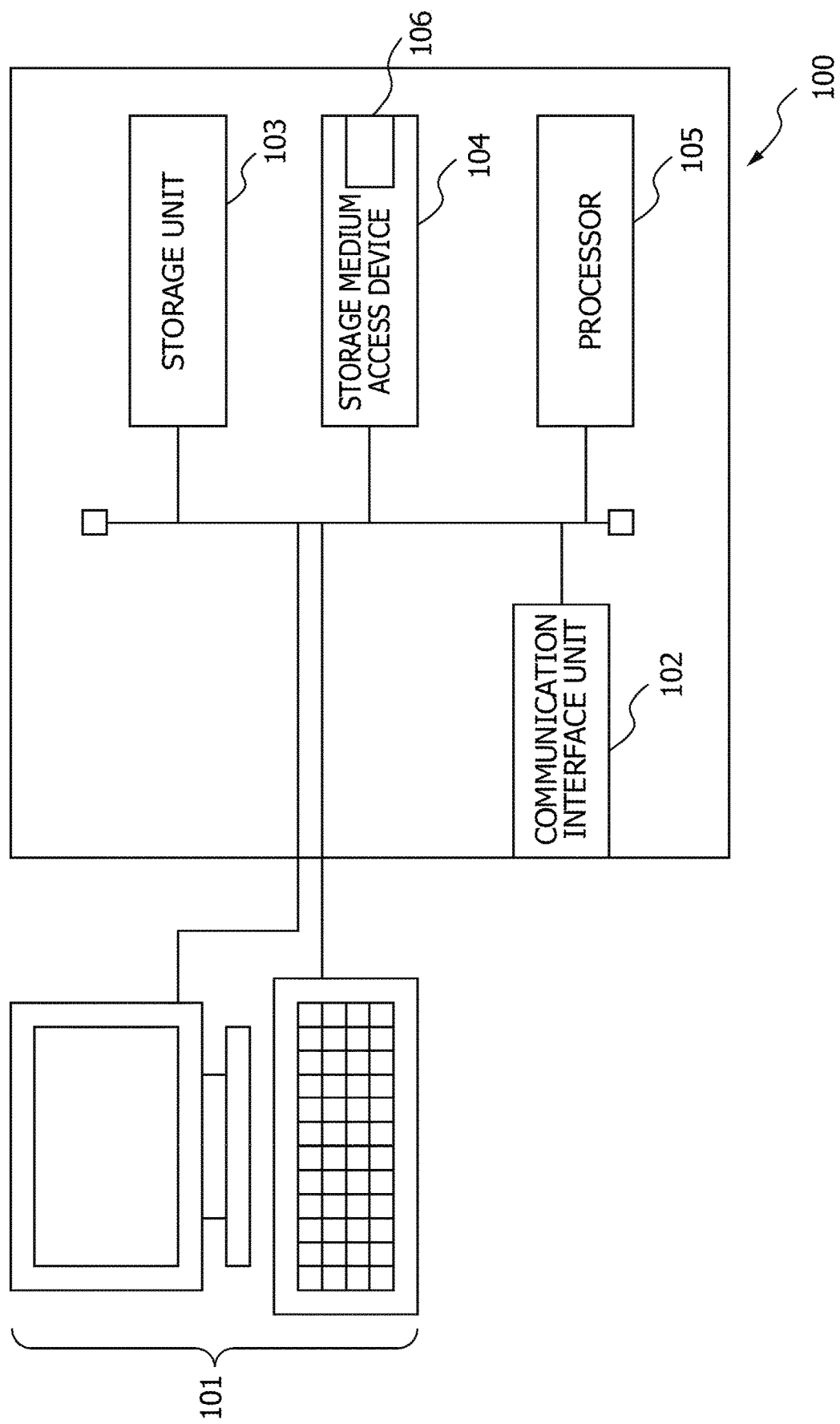

APPARATUS FOR VIDEO ENCODING, APPARATUS FOR VIDEO DECODING, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2016-250950, filed on Dec. 26, 2016, the entire contents of which are incorporated herein by reference.

FIELD

The embodiments discussed herein are related to, for example, an apparatus for video encoding which encodes an encoding target picture using information on another picture, an apparatus for video decoding which decodes a picture that has been encoded using information on another picture, and a non-transitory computer-readable storage medium.

BACKGROUND

Typically, video data has a very large data size. Therefore, an apparatus that handles video data compresses the video data by encoding when the apparatus transmits the video data to another apparatus or when the apparatus stores the video data in a storage device. As typical video encoding standards, Advanced Video Coding (MPEG-4 AVC|ITU-T H.264) and High Efficiency Video Coding (HEVC|ITU-T H.265) have been formulated (for example, see 'ITU-T Recommendation H.264|ISO/IEC 14496-10 "Advanced Video Coding for generic audiovisual services", October 2016', and 'ITU-T Recommendation H.265I ISO/IEC 23008-2 "High Efficiency Video Coding", April 2015').

In such encoding standards, a picture as an encoding target is divided into blocks. In addition, for each of the encoding target blocks, a predictive block is generated from another already-encoded picture or an already encoded area of the encoding target picture, and redundancy is reduced by encoding a difference between the encoding target block and the predictive block.

In addition, in such encoding standards, an inter-predictive coding scheme using a reference picture (also referred to as a local decoding picture) obtained by decoding another already-encoded picture is used when a predictive block is generated. In the inter-predictive coding scheme, for the encoding target block, an area the most similar to the reference picture is obtained as a reference block in order to compensate for the movement between pictures. In addition, a predictive block is generated based on the reference block. In the inter-predictive coding scheme, typically, a higher compression efficiency than that of an intra-predictive coding scheme in which a predictive block is generated from an already-encoded area of the encoding target picture may be achieved.

The inter-predictive coding scheme includes a bi-predictive mode in which a single predictive block is generated using two reference blocks and a uni-predictive mode in which a predictive block is generated using a single reference block. One of the two reference blocks used in the bi-predictive mode may be included in a reference picture before an encoding target picture in order of display time, and the other reference block may be included in a reference picture after the encoding target picture in order of the display time. In addition, the two reference blocks may be respectively included in two different reference pictures before the encoding target picture in order of the display time, or may be respectively included in two different reference pictures after the encoding target picture in order of the display time. When the bi-predictive mode is used, in the video encoding apparatus, the influence of imagining noise and encoding noise included in the reference block is reduced, and a predictive block having higher accuracy may be created. As a result, the encoding efficiency is improved. In the uni-predictive mode, the video encoding apparatus may generate a predictive block using one of the two reference blocks used in the bi-predictive mode, and for example, in HEVC, the predictions are respectively referred to as L0 prediction and L1 prediction. The L0 prediction and the L1 prediction are used when there is merely a single reference picture or when there does not exist an area similar to an encoding target block, which is to be a reference block in one of the reference pictures.

In the encoding standard such as MPEG-4 AVC or HEVC, in order to efficiently apply the coding schemes and suppress propagation of an error due to encoding between pictures, three types of pictures such as an I picture, a P picture, and a B picture are used. The I picture is a picture encoded merely using the intra-predictive coding scheme from among the inter-predictive coding scheme and the intra-predictive coding scheme. The P picture is a picture encoded using the uni-predictive mode (L0/L1 prediction) or the intra-predictive coding scheme. In addition, the B picture is a picture encoded using any of the intra-predictive coding scheme, the uni-predictive mode, and the bi-predictive mode. In the P picture and the B picture, usage of one of the coding schemes and the predictive modes, which is allowed to be applied, may be switched for each block.

SUMMARY

According to an aspect of the invention, an apparatus for a video encoding process that includes encoding an encoding target block from among a plurality of blocks obtained by performing division of an encoding target picture included in video data, to which a bi-predictive mode is allowed to be applied includes: a memory; and a processor coupled to the memory and configured to execute a difference process that includes calculating a difference value between a corresponding first pixel of a first reference block and a corresponding second pixel of a second reference block, the first reference block being referred to for the encoding target block and being on a first encoded reference picture in a first direction from the encoding target picture, the second reference block being referred to for the encoding target block and being on a second encoded reference picture in a second direction from the encoding target picture; execute a predictive process that includes generating a predictive block by calculating a value of a corresponding pixel of the predictive block based on a value of the corresponding first pixel of the first reference block and a value of the corresponding second pixel of the second reference block in accordance with the bi-predictive mode for each pixel in which an absolute value of the difference value is less than a threshold value, and by calculating the value of the corresponding pixel of the predictive block based on either one of the value of the corresponding first pixel of the first reference block or the value of the corresponding second pixel of the second reference block for each pixel in which the absolute value of the difference value is the threshold value or more; and execute an encoding process that includes calculating a predictive error between the corresponding pixels of the encoding target block and the predictive block, and encoding the predictive error.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a configuration diagram illustrating a computer that operates as the video encoding apparatus or the video decoding apparatus according to embodiments or modifications when a computer program operates that realizes a function of each unit of the operating video encoding apparatus or video decoding apparatus.

DESCRIPTION OF EMBODIMENTS

As described above, in the B picture, a predictive mode allowed to be applied may be switched for each block. Therefore, when a subject (for convenience of explanation, hereinafter referred to as an obstacle) that appears in one of the two reference blocks is included in the B picture, information on the obstacle is included in a predictive block that is generated in the bi-predictive mode. For example, in HEVC, a predictive block is generated by calculating a weighted average value of pixel values of corresponding pixels of the two reference blocks as a value of the corresponding pixel of the predictive block, in the bi-predictive mode. Therefore, when an obstacle is included in one of the reference blocks, for a pixel in which the obstacle appears, a weighted average value of a pixel value in which the obstacle appears and a pixel value in which the obstacle does not appear (for example, a pixel value indicating an object that exists behind the obstacle) becomes a pixel value of the corresponding pixel of the predictive block. Thus, regardless of whether the obstacle is included in the encoding target block, the generated predictive block becomes a predictive block with insufficient accuracy.

An object of embodiments of the technology discussed herein is to provide a video encoding apparatus in which predictive accuracy for an encoding target block in a predictive block is improved.

A video encoding apparatus according to an embodiment is described below with reference to drawings. First, a predictive block is described that is generated when an obstacle is included in one of two reference blocks in a case in which a bi-predictive mode is used.

Figure 1:
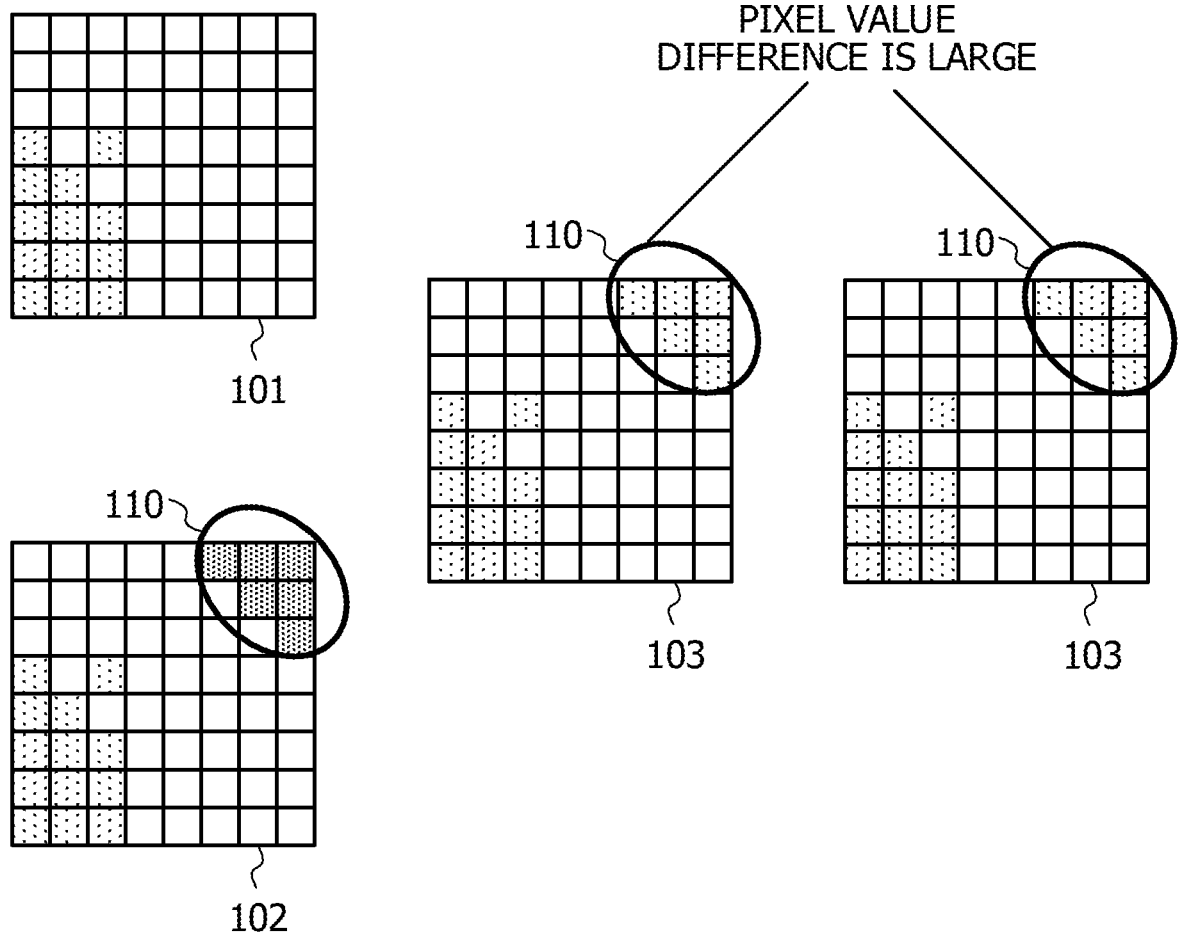
FIG. 1 is a diagram illustrating an example of two reference blocks, a predictive block, and an encoding target block.

FIG. 1 is a diagram illustrating an example of two reference blocks, a predictive block, and an encoding target block. In this example, an obstacle 110 appears in the vicinity of the upper right of an L1 predictive block 102 from among an L0 predictive block 101 and the L1 predictive block 102 that are reference blocks. As a result, even a value of a pixel in the vicinity of the upper right of the predictive block 103 generated from the L0 predictive block 101 and the L1 predictive block 102 is affected by the obstacle 110. Therefore, when an encoding target block 104 and the predictive block 103 are compared with each other, for each of the pixels that have been affected by the obstacle 110, a difference between the pixel values becomes large. As a result, the encoding efficiency for the encoding target block 104 is reduced. In such a case, it is conceivable that, in the uni-predictive mode, a predictive block is generated based on the L0 predictive block 101 that is more similar to the encoding target block 104 from among the two reference blocks. However, typically, in the bi-predictive mode, a predictive block having higher predictive accuracy may be generated as compared with the uni-predictive mode. Therefore, in an area that does not include the obstacle 110, it is highly probable that the predictive block 103 is similar to the encoding target block 104 as compared with the predictive block that has been generated using the uni-predictive mode.

Therefore, in the embodiment, the video encoding apparatus calculates a difference value between corresponding pixels of the two reference blocks for an encoding target block to which the bi-predictive mode is applied. In addition, when the number of pixels in each of which an absolute value of the difference value is a specific threshold value or more is a specific number or more, the video encoding apparatus switches a predictive mode to be applied, for each of the pixels. That is, for a pixel in which the absolute value of the difference value is less than the specific threshold value, the video encoding apparatus calculates a value of the corresponding pixel of the predictive block in accordance with the bi-predictive mode. In addition, for a pixel in which the absolute value of the difference value is the specific threshold value or more, the video encoding apparatus calculates a value of the corresponding pixel of the predictive block in accordance with the uni-predictive mode using an image having a smaller error from among the two reference blocks. In the following description, a predictive mode that is applied so as to be switched for each pixel and in which a predictive block is generated is referred to as a pixel unit predictive mode to generate a predictive block. In addition, when the number of pixels in each of which the absolute value of the difference value is the specific threshold value or more is less than the specific number, the video encoding apparatus generates a predictive block in accordance with the bi-predictive mode.

The picture may be any of a frame or a field. The frame is a single still image in video data, and the field is a still image obtained by extracting only pieces of data of an odd-numbered row or pieces of data of an even-numbered row from the frame.

In addition, in the embodiment, it is assumed that the video encoding apparatus encodes video data in conformity with HEVC. However, the video encoding apparatus may encode video data in conformity with another encoding standard in which a bi-predictive mode is allowed to be applied.

Figure 2:
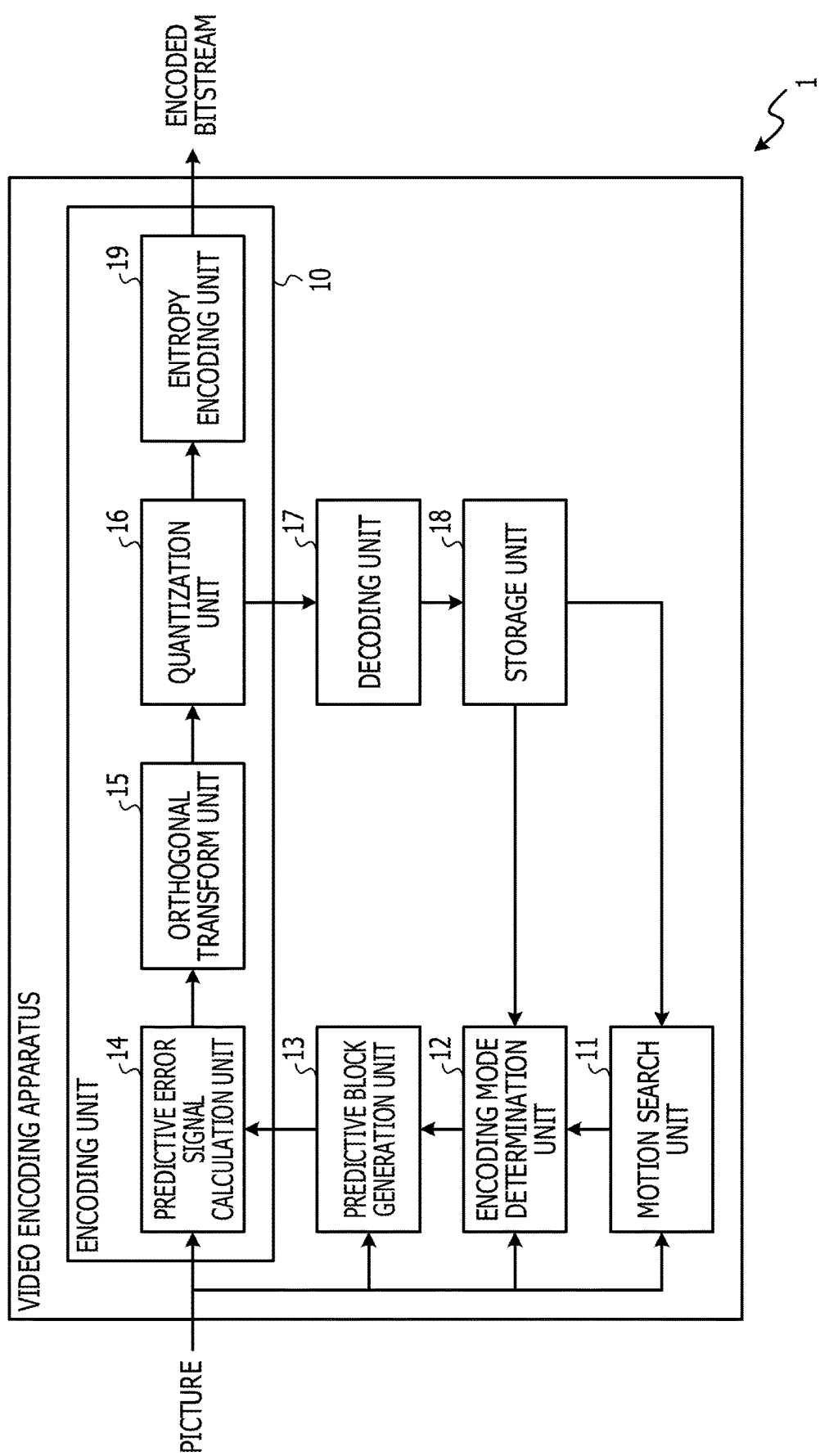
FIG. 2 is a schematic configuration diagram illustrating a video encoding apparatus according to an embodiment.

FIG. 2 is a schematic configuration diagram illustrating a video encoding apparatus according to the embodiment. A video encoding apparatus 1 includes a motion search unit 11, an encoding mode determination unit 12, a predictive block generation unit 13, a predictive error signal calculation unit 14, an orthogonal transform unit 15, a quantization unit 16, a decoding unit 17, a storage unit 18, and an entropy encoding unit 19. From among the units, the predictive error signal calculation unit 14, the orthogonal transform unit 15, the quantization unit 16, and the entropy encoding unit 19 constitutes an encoding unit 10 that encodes a predictive error signal between corresponding pixels of the encoding target block and the predictive block.

In HEVC to which the video encoding apparatus 1 conforms, each picture included in the video data is divided at a plurality of stages. Here, division of a picture in HEVC is described.

Figure 3:
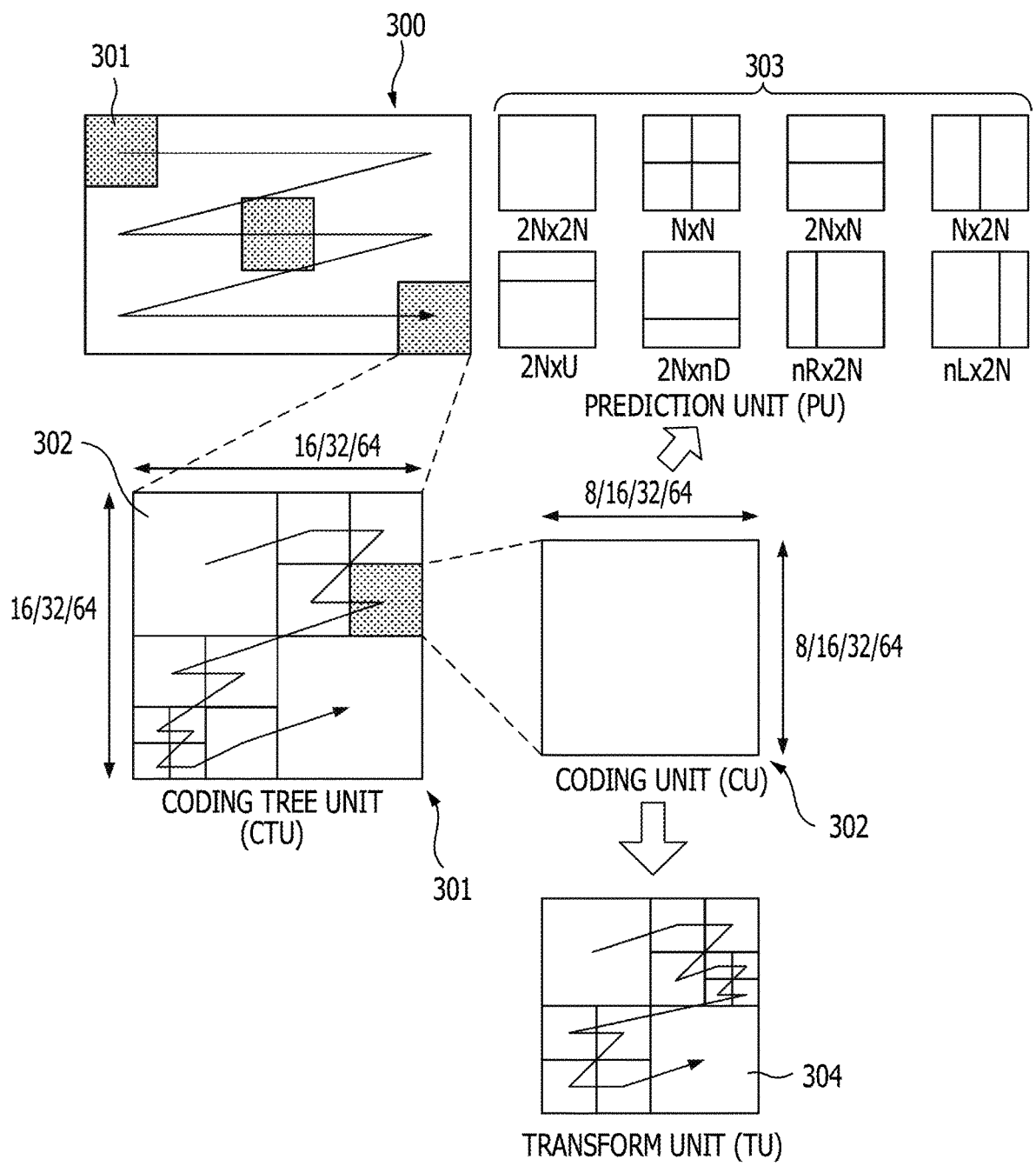
FIG. 3 is a diagram illustrating division of a picture by HEVC.

FIG. 3 is a diagram illustrating division of a picture by HEVC. As illustrated in FIG. 3, a picture 300 is divided into coding tree units (CTUs) each of which is a unit of an encoding process, and CTUs 301 are encoded in raster scan order. The size of the CTU 301 may be selected from among 64×64 to 16×16 pixels.

The CTU 301 is further divided into a plurality of coding units (CUs) 302 by a quadtree structure. The CUs 302 in the single CTU 301 are encoded in Z scan order. The size of the CU 302 is variable, and the size is selected from among 8×8 to 64×64 pixels in a CU division mode. The CU 302 is a unit for which the intra-predictive coding scheme or the inter-predictive coding scheme that is an encoding mode is selected.

The CU 302 is individually processed in each predictive unit (PU) 303 or each transform unit (TU) 304. The PU 303 is a unit of generation of a predictive block on which predictive corresponding to an encoding mode is performed. For example, in the intra-predictive coding scheme, the PU 303 is a unit to which a predictive mode is applied that defines a generation method of a predictive block and a pixel to be referred to when the predictive block is generated. In addition, in the inter-predictive coding scheme, the PU 303 is a unit in which motion compensation is made. For example, when the inter-predictive coding scheme is applied, the size of the PU 303 may be selected from among 2N×, N×, 2N×N, N×2N, 2N×U, 2N×nD, nR×2N, and nL×2N (N=CU/2). In addition, the TU 304 is a unit of orthogonal transform, and orthogonal transform is performed for each of the TUs. The size of the TU 304 is selected from among 4×4 pixel to 32×32 pixel. The TU 304 is divided by the quadtree structure, and processed in the Z scan order. The CU and the PU are examples of an encoding target block.

The video encoding apparatus 1 encodes the CTUs in the raster scan order for the picture that is the encoding target. Therefore, in the following description, an example in which a process for a single CTU is described as an example for each of the units in the video encoding apparatus 1.

When an encoding target picture including an encoding target CTU is a P picture or a B picture to which the inter-predictive coding scheme is allowed to be applied, the motion search unit 11 calculates a moving vector for each PU to which the inter-predictive coding scheme is allowed to be applied, for the encoding target CTU. The type of the encoding target picture is determined, for example, based on a structure of a group of pictures (GOP) that a control unit (not illustrated) applies to video data that is an encoding target and a location of the encoding target picture in the GOP.

The motion search unit 11 identifies a reference block that most closely matches a target PU of the encoding target CTU by performing block matching on an area allowed to be referred to for a local decoding picture for a target PU. In addition, the motion search unit 11 calculates a vector indicating a movement amount between the target PU and the reference block as a moving vector. When the encoding target picture is a B picture, the motion search unit 11 calculates a moving vector for each of the L0 predictive and the L1 predictive. The motion search unit 11 notifies the encoding mode determination unit 12 of the moving vector of each of the PUs while storing the moving vector in the storage unit 18.

The encoding mode determination unit 12 determines division modes of the CU, the PU, and the TU, in each of which the encoding target CTU is divided and an encoding mode applied for each of the CUs. The encoding mode determination unit 12 determines an encoding mode of the encoding target CTU, for example, based on information indicating the type of a picture that is an encoding target including the encoding target CTU, which has been obtained from a control unit that is not illustrated. When the type of the picture that is the encoding target corresponds to the I picture to which merely the intra-predictive coding scheme is allowed to be applied, the encoding mode determination unit 12 selects the intra-predictive coding scheme as the encoding mode to be applied. In addition, when the type of the picture that is the encoding target corresponds to the P picture or the B picture, the encoding mode determination unit 12 selects, for example, any one of the inter-predictive coding scheme and the intra-predictive coding scheme as the encoding mode to be applied.

The encoding mode determination unit 12 calculates, for each of the CUs, an encoding cost that is an evaluation value of an encoded data size of the encoding target CTU for the encoding mode allowed to be applied. For example, the encoding mode determination unit 12 calculates an encoding cost for each combination of the CU division mode and the PU division mode in each of which division of the CTU is performed, and a vector mode that defines a generation method of a predictive vector of a moving vector, for the inter-predictive coding scheme. The encoding mode determination unit 12 may use, for example, any one of an adaptive motion vector predictive (AMVP) mode and a merge mode, as the vector mode.

In addition, in the intra-predictive coding scheme, the encoding mode determination unit 12 calculates an encoding cost for each combination of the predictive mode and the CU division mode or the PU division mode in which division of the CTU is performed.

The encoding mode determination unit 12 calculates a predictive error, that is, a pixel difference absolute value sum SAD, for example, for the target PU in accordance with the following equation in order to calculate an encoding cost.

$$SAD = \Sigma |Org\ Pixel - Pred\ Pixel|$$

Here, "OrgPixel" is a value of a pixel included in the target PU, and "PredPixel" is a value of a pixel included in the predictive block that has been generated in accordance with the encoding mode, which is a calculation target of an encoding cost and corresponds to the target block.

In addition, the encoding mode determination unit 12 calculates an encoding cost "Cost" for the target CU, for example, in accordance with the following equation.

$$Cost = \Sigma SAD + \lambda * B$$

Here, "ΣSAD" is a sum of SADs that have been calculated for the PUs included in the target CU. In addition, "B" is an estimation value of a code amount for an item other than the predictive error such as a moving vector or a flag indicating a predictive mode. In addition, "λ," is a Lagrange's undetermined multiplier.

The encoding mode determination unit 12 may calculate an absolute value sum SATD of Hadamard coefficients of the pixels obtained after Hadamard transformation has been performed on a difference image between the target PU and the predictive block, instead of the SAD.

For the encoding target CTU, the encoding mode determination unit 12 sets a target CU, for example, in order of a CU having the largest size, from among the obtained CU sizes. In addition, the encoding mode determination unit 12 selects a predictive mode in which a cost becomes minimum for each PU division mode in the target CU, for the intra-predictive coding scheme. In addition, the encoding mode determination unit 12 selects a vector mode in which a cost becomes minimum for each PU division mode in the target CU, for the inter-predictive coding scheme. In addition, the encoding mode determination unit 12 selects a coding scheme in which an encoding cost is small from among the intra-predictive coding scheme and the inter-predictive coding scheme as an encoding mode applied to each of the CUs having the same size.

In addition, the encoding mode determination unit 12 executes a process similar to the above-described process and calculates a minimum encoding cost using each CU obtained by dividing the target CU into 4 as the next target CU. In addition, when a sum of minimum encoding costs that have been respectively calculated for the four divided CUs is smaller than the minimum encoding cost of the target CU, the encoding mode determination unit 12 divides the target CU into four. The encoding mode determination unit 12 determines a CU division mode and a PU division mode that are applied to the encoding target CTU by repeating the above-described process until division of each of the CUs is not performed.

In addition, the encoding mode determination unit 12 determines a TU division mode, for each of the CUs corresponding to the CU division mode that has been determined as described above. At that time, the encoding mode determination unit 12 calculates an RD cost "Cost" in accordance with the following equation, for each of the TU division modes allowed to be applied.

$$Cost = \sum_i (org(i) - Idec(i))^2 + \lambda \cdot bit \quad (1)$$

Here, "org (i)" indicates a value of a pixel included in the target CU, and "Idec (i)" indicates a value of a pixel obtained by encoding the CU using the target TU division mode and decoding the encoded CU. In addition, "bit" indicates a code amount when the CU has been encoded using the target TU division mode. The first term on the right side of the equation (1) indicates encoding distortion, and the second term on the right side of the equation (1) indicates a code amount. Therefore, in the TU division mode in which the RD cost becomes minimum, the encoding distortion and the code amount are optimally balanced. Therefore, the encoding mode determination unit 12 selects a TU division mode in which the RD cost "Cost" becomes minimum.

The encoding mode determination unit 12 notifies the predictive block generation unit 13 of a combination of the CU and the PU division modes and the encoding mode that have been selected for the encoding target CTU, and notifies the predictive error signal calculation unit 14 of the TU division mode. In addition, the encoding mode determination unit 12 stores the combination of the division modes and the encoding modes of the CU, the PU, and the TU that have been selected for the encoding target CTU in the storage unit 18.

The predictive block generation unit 13 generates a predictive block for each of the PUs in accordance with the combination of the division modes and the encoding modes of the CU and the PU that have been selected for the encoding target CTU. When the intra-predictive encoding is performed on the target CU, the predictive block generation unit 13 generates a predictive block based on a value of a pixel around each of the PUs in the CU in the local decoding block, which is referred to in accordance with the predictive mode that has been selected for the PU.

In addition, when the inter-predictive encoding is performed on the target CU, the predictive block generation unit 13 generates a predictive block by performing movement compensation on the local decoding picture that has been read from the storage unit 18, based on the moving vector that has been calculated for each PU in the CU.

When the encoding mode determination unit 12 determines that the bi-predictive mode is applied to any of the PUs in the target CU, the predictive block generation unit 13 determines whether the predictive mode is switched for each pixel of the PU. In addition, the predictive block generation unit 13 generates a predictive block while switching the predictive mode for each of the pixels when the predictive block generation unit 13 determines that the predictive mode is switched for each of the pixels. The detail of the switching of a predictive mode for each pixel is described later. The predictive block generation unit 13 transmits the generated predictive block to the predictive error signal calculation unit 14.

The predictive error signal calculation unit 14 executes difference calculation with a corresponding pixel of the predictive block that has been generated by the predictive block generation unit 13, for each pixel in the encoding target CTU. In addition, for each TU in the encoding target CTU, the predictive error signal calculation unit 14 sets a difference value corresponding to each pixel in the TU, which has been obtained by the difference calculation as a predictive error signal of the TU. The predictive error signal calculation unit 14 transmits a predictive error signal of each of the TUs in the encoding target CTU to the orthogonal transform unit 15.

In addition, the predictive error signal calculation unit 14 creates a predictive vector of each of the PUs on which the inter-predictive encoding has been performed, in accordance with the vector mode that has been determined to be applied by the encoding mode determination unit 12. In addition, the predictive error signal calculation unit 14 calculates a predictive error signal between the predictive vector and the moving vector of the PU. The predictive error signal calculation unit 14 transmits the predictive error signal of the moving vector of each of the PUs on which the inter-predictive encoding has been performed, to the entropy encoding unit 19.

The orthogonal transform unit 15 obtains orthogonal transform coefficients respectively indicating a frequency component in a horizontal direction of the predictive error signal and a frequency component in a vertical direction of the predictive error signal by performing orthogonal transform on the predictive error signal of each of the TUs in the encoding target CTU. For example, the orthogonal transform unit 15 obtains a set of discrete cosine transform (DCT) coefficients as orthogonal transform coefficients by executing DCT as the orthogonal transform process, for the predictive error signal.

The orthogonal transform unit 15 transmits the orthogonal transform coefficients for each of the TUs to the quantization unit 16.

The quantization unit 16 calculates a quantized orthogonal transform coefficient by quantizing the orthogonal transform coefficients for each of the TUs in accordance with a quantization parameter including a qp value by which a quantization width is specified, in the encoding target CTU. In the following description, the quantized orthogonal transform coefficient may be simply referred to as a quantization coefficient. The quantization unit 16 outputs the quantized orthogonal transform coefficient to the decoding unit 17 and the entropy encoding unit 19.

The decoding unit 17 generates a local decoding block to be referred to in order to encode the CU or the like after each of the TUs in the encoding target CTU from a quantization coefficient of the TU, and store the local decoding block in the storage unit 18. Therefore, the decoding unit 17 restores the orthogonal transform coefficient before the quantization by performing inverse quantization on the quantized quantization coefficient of each of the TUs.

The decoding unit 17 performs inverse orthogonal transform on the restored orthogonal transform coefficient, for each of the TUs. For example, when the orthogonal transform unit 15 uses the DCT as orthogonal transform, the decoding unit 17 executes an inverse DCT process as the inverse orthogonal transform. As a result, the decoding unit 17 restores the predictive error signal having information equivalent to the predictive error signal before the encoding, for each of the TUs.

The decoding unit 17 generates the local decoding block by adding the restored predictive error signal to each of the pixel values of the predictive block, for each of the TUs. The decoding unit 17 stores the local decoding block in the storage unit 18 each time a local decoding block is generated.

In addition, the decoding unit 17 writes a local decoding picture obtained by combining local decoding blocks corresponding to a sheet of picture in accordance with the encoding order of the CTUs, into the storage unit 18.

The storage unit 18 temporarily stores the local decoding blocks that have been received from the decoding unit 17. The storage unit 18 supplies the local decoding picture or the local decoding blocks to the motion search unit 11, the encoding mode determination unit 12, and the predictive block generation unit 13. The storage unit 18 stores local decoding pictures having the specific number of sheets, which have been defined in advance, and probably referred to by the encoding target picture, and discards a local decoding picture in order of a picture the encoding of which is old when the number of local decoding pictures exceeds the specific number of sheets. In addition, the storage unit 18 stores a moving vector for each of the local decoding blocks on which the inter-predictive encoding has been performed. In addition, the storage unit 18 stores a combination of the division modes and the encoding modes of the CU, the PU, and the TU that have been selected for each of the CTU s.

The entropy encoding unit 19 performs entropy encoding on a syntax, a predictive error signal of the moving vector of each of the PUs, a quantization coefficient of each of the TUs of the encoding target CTU, and the like. As described later, the syntax includes information on a predictive direction when the pixel unit predictive mode is applied. In addition, the syntax may include information on a threshold value used to determine whether the pixel unit predictive mode is applied.

In the embodiment, the entropy encoding unit 19 uses an arithmetic encoding process such as context-based adaptive binary arithmetic coding (CABAC) as an entropy coding scheme. In addition, the entropy encoding unit 19 performs output of a bitstream obtained by the entropy encoding.

An encoded bitstream including encoded video data is obtained by combining bitstreams of the CTUs, which have been output by the entropy encoding unit 19, in specific order, and adding header information or the like defined in HEVC to the combined bitstreams. The video encoding apparatus 1 stores the encoded bitstream in a storage device (not illustrated) including a magnetic recording medium, an optical recording medium, a semiconductor memory, or the like, or outputs the encoded bitstream to another device.

The detail of application of a predictive mode for each pixel and the detail of determination the application in the predictive block generation unit 13 is described below.

Figure 4:
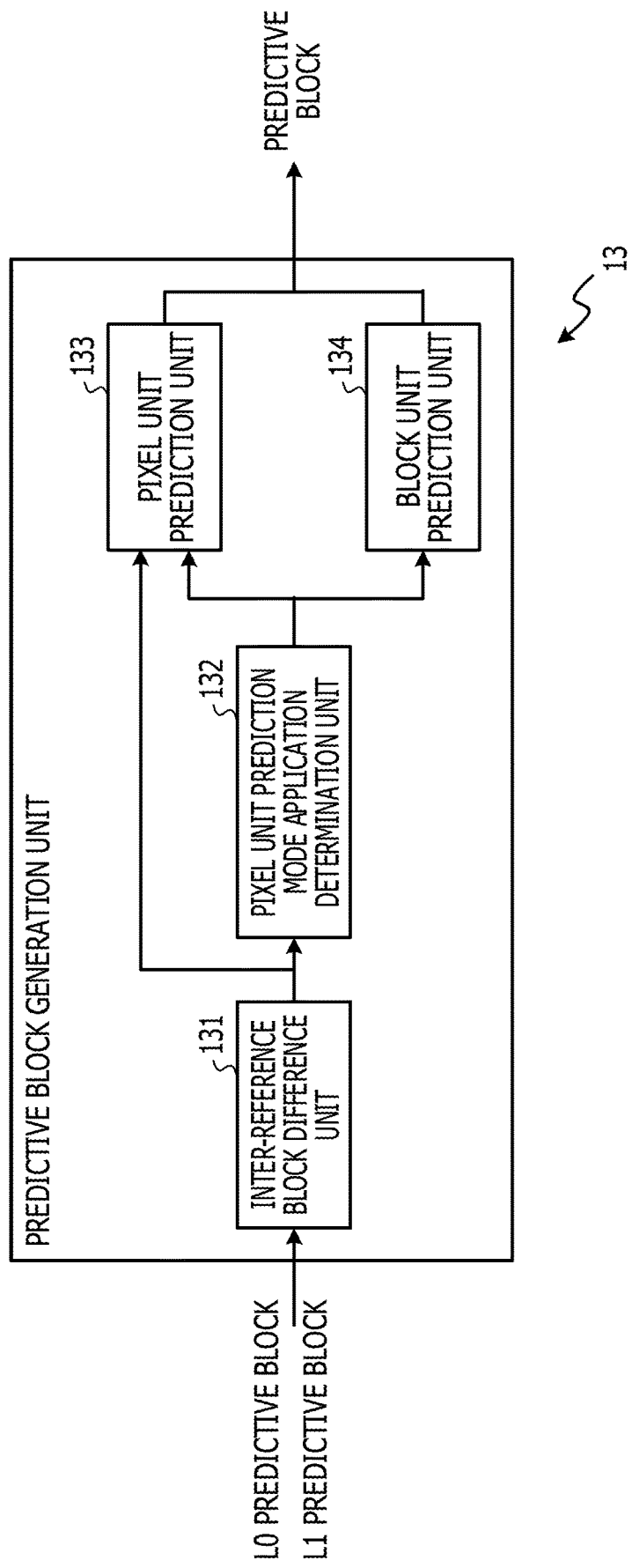
FIG. 4 is a block diagram illustrating a predictive block generation unit, which is related to application of a pixel unit predictive mode and determination of the application.

FIG. 4 is a block diagram illustrating the predictive block generation unit 13, which is related to the application of a pixel unit predictive mode and determination of the application. The predictive block generation unit 13 includes an inter-reference block difference unit 131, a pixel unit predictive mode application determination unit 132, a pixel unit predictive unit 133, and a block unit predictive unit 134.

The inter-reference block difference unit 131 is an example of a difference unit, and calculates a difference absolute value between pixel values of corresponding pixels of the L0 predictive block and the L1 predictive block, for each PU in a CU to which the bi-predictive mode has been determined to be applied. In addition, the inter-reference block difference unit 131 notifies the pixel unit predictive mode application determination unit 132 and the pixel unit predictive unit 133 of the difference absolute value for each pixel of the PU.

The pixel unit predictive mode application determination unit 132 is an example of a determination unit, and determines whether the pixel unit predictive mode is applied for each of the PUs in the CU to which the bi-predictive mode has been determined to be applied. Therefore, the pixel unit predictive mode application determination unit 132 compares the difference absolute value of each of the pixels with a difference threshold value, and counts the number of pixels in each of which the difference absolute value is the difference threshold value or more. In the following description, for convenience of explanation, the pixel in which the difference absolute value becomes the difference threshold value or more is referred to as an occlusion pixel, and the number of occlusion pixels included in the encoding target block (PU in this example) is referred to as an occlusion number. In addition, the pixel unit predictive mode application determination unit 132 compares the occlusion number with an occlusion threshold value, for each of the PUs. The pixel unit predictive mode application determination unit 132 determines that the pixel unit predictive mode is applied to a PU in which the occlusion number is the occlusion threshold value or more, and determines that the bi-predictive mode is applied to a PU in which the occlusion number is less than the occlusion threshold value.

The same difference threshold value is set, for example, to the video encoding apparatus 1 and the video decoding apparatus. In this case, for example, when a pixel value (luminance value or color difference value) is expressed by 8-bit gradation, the difference threshold value is set at between 10 to 30. Alternatively, the difference threshold value is set by the video encoding apparatus 1, and information indicating the set difference threshold value may be included in an encoded bitstream of the video data. In this case, the information indicating the set difference threshold value may be included, for example, in a high level syntax such as a sequence parameter set (SPS) or a picture parameter set (PPS) in HEVC, or may be included in a syntax of a CU or a PU. In addition, entropy encoding may be performed on the information indicating the set difference threshold value by the entropy encoding unit 19, and the information may be included in the encoded bitstream.

Similarly, the same occlusion threshold value may also be set, in advance, to the video encoding apparatus 1 and the video decoding apparatus in advance. In this case, the occlusion threshold value is set, for example, at a value corresponding to a specific proportion (for example, ⅛) for the number of pixels included in the block (PU in this example) that is a target to which whether the pixel unit predictive mode is allowed to be applied is determined. Alternatively, the occlusion threshold value is also set by the video encoding apparatus 1, and information indicating the set occlusion threshold value may be included in the encoded bitstream of the video data. In this case, the information indicating the set occlusion threshold value may be included, for example, in a high level syntax such as an SPS or a PPS in HEVC, or may be included in a syntax of a CU or a PU. In addition, entropy encoding may also be performed on the information indicating the set occlusion threshold value by the entropy encoding unit 19, and the information may be included in the encoded bitstream.

In a modification, the pixel unit predictive mode application determination unit 132 may determine whether the pixel unit mode predictive mode is applied for each of the CUs. In this case, the pixel unit predictive mode application determination unit 132 may calculate an occlusion number for each of the CUs, and determine that the pixel unit predictive mode is applied to a CU in which the occlusion number is the occlusion threshold value or more.

The pixel unit predictive mode application determination unit 132 notifies the pixel unit predictive unit 133 and the block unit predictive unit 134 of a determination result indicating whether the pixel unit predictive mode is allowed to be applied, for each of the PUs or each of the CUs. In addition, when the video encoding apparatus 1 performs setting of a difference threshold value and an occlusion threshold value, the pixel unit predictive mode application determination unit 132 notifies the entropy encoding unit 19 of the difference threshold value and the occlusion threshold value.

The pixel unit predictive unit 133 generates a predictive block in accordance with the pixel unit predictive mode, for a PU to which the pixel unit predictive mode is applied or each PU included in a CU to which the pixel unit predictive mode is applied.

For a pixel in which a difference absolute value between pixel values of corresponding pixels of the L0 predictive block and the L1 predictive block is less than the difference threshold value, the pixel unit predictive unit 133 calculates a value of the corresponding pixel of the predictive block based on the L0 predictive block and the L1 predictive block in accordance with the bi-predictive mode. That is, for the pixel, the pixel unit predictive unit 133 calculates the value of the corresponding pixel of the predictive block by performing weighted averaging on the values of the corresponding pixels of the L0 predictive block and the L1 predictive block. A weighting factor for the L0 predictive block is set, for example, depending on an inverse number of a display time difference between the encoding target picture and the reference picture including the L0 predictive block. Similarly, a weighting factor for the L1 predictive block is set, for example, depending on an inverse number of a display time difference between the encoding target picture and the reference picture including the L1 predictive block.

In addition, for the occlusion pixel, the pixel unit predictive unit 133 calculates a value of the corresponding pixel of the predictive block based on one of the L0 predictive block and the L1 predictive block, in accordance with the uni-predictive mode. For example, for an aggregate area of the occlusion pixels (hereinafter referred to as an occlusion area), the pixel unit predictive unit 133 utilizes a block in which a statistics value of predictive errors of the corresponding pixels with the encoding target block is smaller, from among the L0 predictive block and the L1 predictive block, for generation of a predictive block.

In order to determine a used block from among the L0 predictive block and the L1 predictive block, for example, the pixel unit predictive unit 133 calculate a sum SADL0 of difference absolute values between corresponding pixels of the L0 predictive block and a PU that is an encoding target as the statistics value of predictive errors, for the pixels in the occlusion area. Similarly, the pixel unit predictive unit 133 calculates a sum SADL1 of difference absolute values between corresponding pixels of the L1 predictive block and the PU that is the encoding target as the statistics value of predictive errors. In addition, the pixel unit predictive unit 133 utilizes an Lm predictive block (m=0 or 1) corresponding to a smaller sum from among the sums SADL0 and SADL1 for determination of a value of each of the pixels in the occlusion area of the predictive block. For example, when the L0 predictive block is utilized, it is only sufficient that, for each of the pixels in the occlusion area of the predictive block, the pixel unit predictive unit 133 sets a value of the corresponding pixel of the L0 predictive block as the value of the pixel of the predictive block.

Alternatively, the pixel unit predictive unit 133 may set, as the statistics value of the predictive errors, an encoding cost of the PU that is the encoding target in the uni-predictive mode when the L0 predictive block is used, which has been calculated in a case in which the encoding mode determination unit 12 had determined the encoding mode. Similarly, the pixel unit predictive unit 133 may set, as the statistics value of the predictive errors, an encoding cost of the PU that is the encoding target in the uni-predictive mode when the L1 predictive block is used. In addition, the pixel unit predictive unit 133 may utilize the Lm predictive block having a smaller encoding cost for determination of a value of each of the pixels included in the occlusion area of the predictive block, for the pixel included in the occlusion area. This is why it is assumed that, for each of the pixels outside the occlusion area, a predictive error is relatively small for any of the L0 predictive block and the L1 predictive block, and the statistics value of the predictive errors of the occlusion area contributes greatly to an encoding cost.

The pixel unit predictive unit 133 may determine a predictive image used for the occlusion area for each of the CUs. Even in this case, for each of the CUs, the pixel unit predictive unit 133 may execute a process similar to the above-described process, for the occlusion area included in the CU, and determine a used block from among the L0 predictive block and the L1 predictive block.

The pixel unit predictive unit 133 causes information indicating whether a predictive image used for the occlusion area corresponds to the L0 predictive block or the L1 predictive block, that is, information indicating a predictive direction, to be included in the encoded bitstream of the video data, for each of the CUs or each of the PUs. For example, for each of the CUs or each of the PUs, the pixel unit predictive unit 133 causes the information indicating the predictive direction to be included in a syntax of the CU or the PU. It may be assumed that the information indicating the predictive direction is, for example, a flag having a value that is different depending on whether the L0 predictive block or the L1 predictive block is used. In addition, entropy encoding may be performed on such a syntax by the entropy encoding unit 19.

As described above, the pixel unit predictive unit 133 generates a predictive block by applying one of the bi-predictive mode and the uni-predictive mode for each of the pixels. In addition, the pixel unit predictive unit 133 outputs the generated predictive block to the predictive error signal calculation unit 14. In addition, the pixel unit predictive unit 133 outputs the information indicating the predictive direction to the entropy encoding unit 19.

Figure 5:
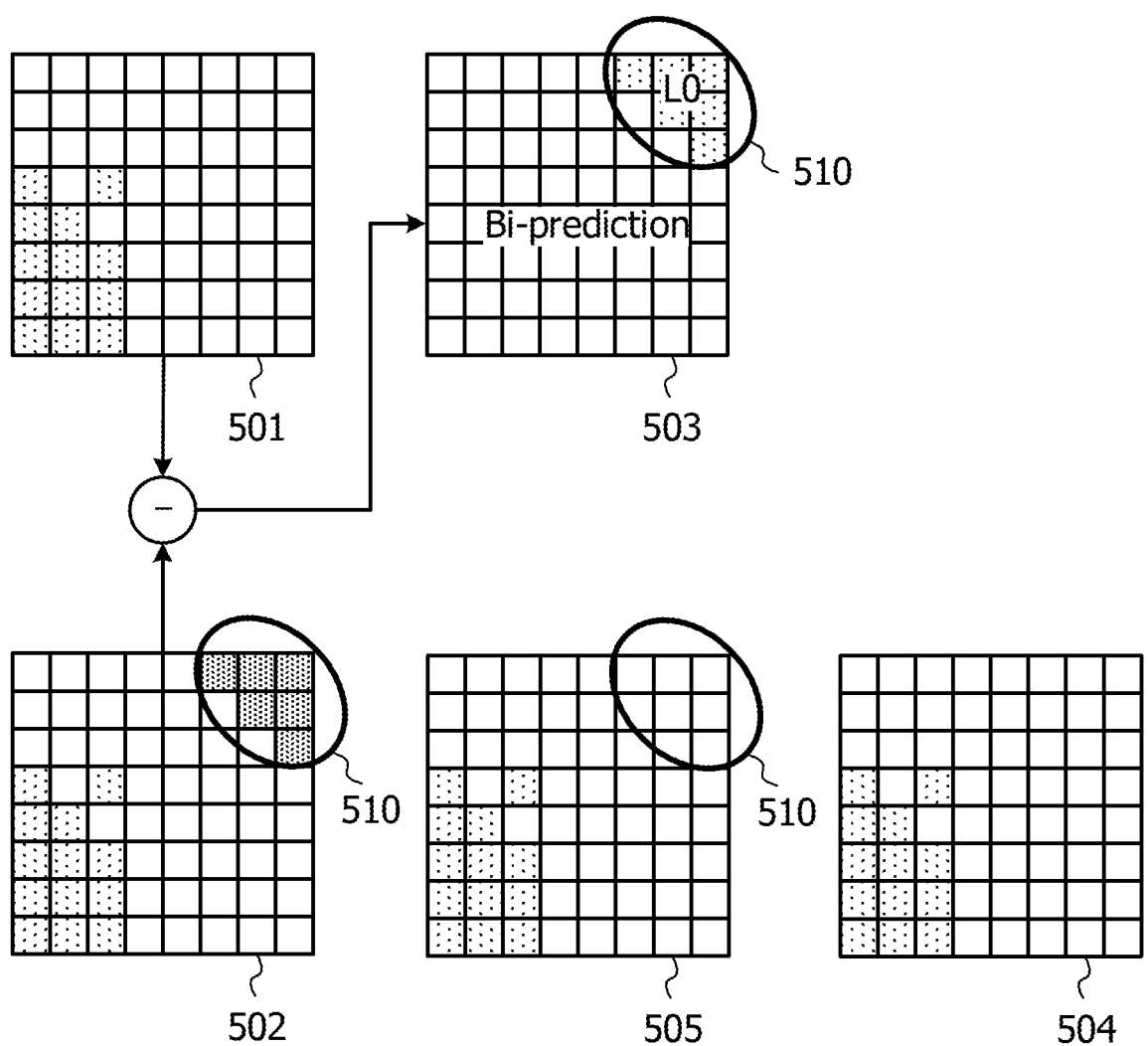
FIG. 5 is a diagram illustrating an example of an L0 predictive block, an L1 predictive block, and a predictive block when the pixel unit predictive mode is applied.

FIG. 5 is a diagram illustrating an example of an L0 predictive block, an L1 predictive block, and a predictive block when the pixel unit predictive mode is applied. In this example, there is an area 510 in which an obstacle appears in the vicinity of the upper right of an L1 predictive block 502 from among an L0 predictive block 501 and the L1 predictive block 502 that are reference blocks. As a result, even in a difference image 503 indicating a difference absolute value between corresponding pixels of the L0 predictive block 501 and the L1 predictive block 502, a difference absolute value for each of the pixels in the area 510 becomes large, so that the area 510 becomes an occlusion area. In addition, in the occlusion area 510, the L0 predictive block 501 is similar to the encoding target block (for example, PU) 504 as compared with the L1 predictive block 502, so that the uni-predictive mode using the L0 predictive block is applied to the occlusion area 510. In addition, the bi-predictive mode is applied to an area other than the occlusion area 510. As a result, in a predictive block 505, the influence of the obstacle is removed even in the occlusion area 510, and as the whole predictive block 505, a predictive error for the encoding target block 504 becomes small.

When an obstacle appears in the occlusion area 510 in the encoding target block 504, the uni-predictive mode using the L1 predictive block is applied to the occlusion area 510. Therefore, even in this case, a predictive block is generated in which a predictive error for the encoding target block 504 is small as compared with a case in which the bi-predictive mode is applied to the whole predictive block.

The block unit predictive unit 134 generates a predictive block, in accordance with the bi-predictive mode, for a PU to which the pixel unit predictive mode is not applied or each PU included in a CU to which the pixel unit predictive mode is not applied. That is, for each of the pixels of the predictive block, the block unit predictive unit 134 may calculate a value of the pixel of the predictive block by performing weighted average on values of the corresponding pixels of the L0 predictive block and the L1 predictive block. A weighting factor for the L0 predictive block is set, for example, depending on an inverse number of a display time difference between the reference picture including the L0 predictive block and the encoding target picture. Similarly, a weighting factor for the L1 predictive block is set, for example, depending on an inverse number of a display time difference between the reference picture including the L1 predictive block and the encoding target picture.

The block unit predictive unit 134 outputs the generated predictive block to the predictive error signal calculation unit 14.

Figure 6:
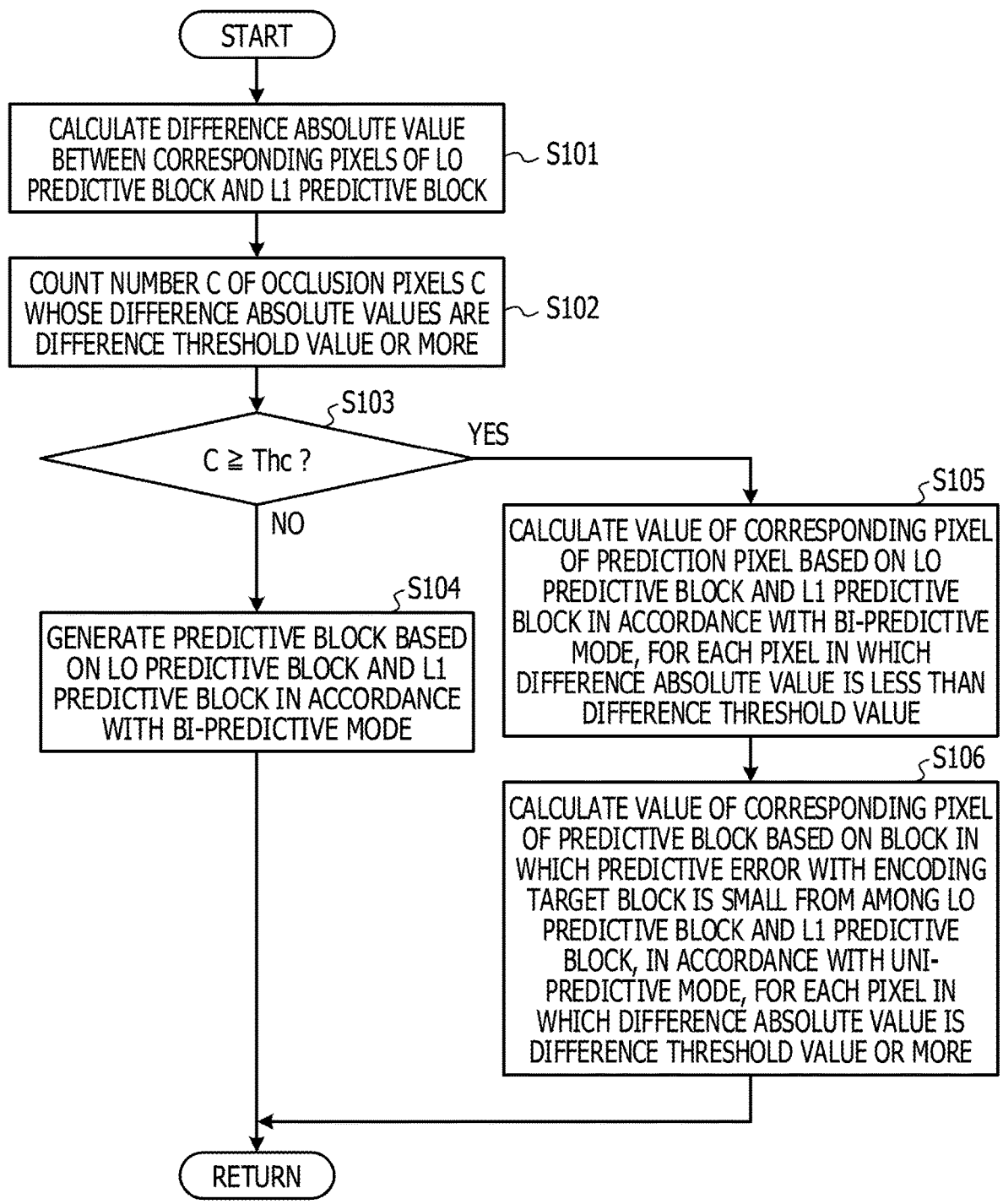
FIG. 6 is an operation flowchart illustrating predictive block generation for an encoding target block to which the bi-predictive mode is applied.

FIG. 6 is an operation flowchart illustrating predictive block generation for the encoding target block (PU or CU) to which the bi-predictive mode is applied, by the predictive block generation unit 13. The predictive block generation unit 13 generates a predictive block in accordance with the following operation flowchart, for each of the encoding target blocks.

The inter-reference block difference unit 131 calculates a difference absolute value between pixel values of corresponding pixels of the L0 predictive block and the L1 predictive block, for each of the pixels (Step S101).

The pixel unit predictive mode application determination unit 132 compares a difference absolute value for each of the pixels with a difference threshold value, and obtains an occlusion number C by counting the number of occlusion pixels in each of which the difference absolute value is the difference threshold value or more (Step S102). In addition, the pixel unit predictive mode application determination unit 132 determines whether the occlusion number C is an occlusion threshold value Thc or more (Step S103).

When the occlusion number C is less than the occlusion threshold value Thc (Step S103-No), the block unit predictive unit 134 applies the bi-predictive mode to the whole predictive block. In addition, the block unit predictive unit 134 generates a predictive block based on the L0 predictive block and the L1 predictive block (Step S104).

In addition, when the occlusion number C is the occlusion threshold value Thc or more (Step S103—Yes), the pixel unit predictive unit 133 applies the bi-predictive mode to each of the pixels in which the difference absolute value is less than the difference threshold value, that is, each of the pixels that are not included in the occlusion area. In addition, the pixel unit predictive unit 133 calculates a value of the corresponding pixel of the predictive block, based on the L0 predictive block and the L1 predictive block (Step S105). In addition, the pixel unit predictive unit 133 applies the uni-predictive mode to each of the occlusion pixels. In addition, the pixel unit predictive unit 133 obtains a value of a pixel of the predictive block, which corresponds to each of the occlusion pixels, based on a block having a smaller statistics value of predictive errors with the encoding target block in the occlusion area, from among the L0 predictive block and the L1 predictive block (Step S106).

The predictive block generation unit 13 ends the predictive block generation process for the encoding target block to which the bi-predictive mode is applied after Step S104 or Step S106. The order of the process of Step S105 and the process of Step S106 may be changed.

Figure 7:
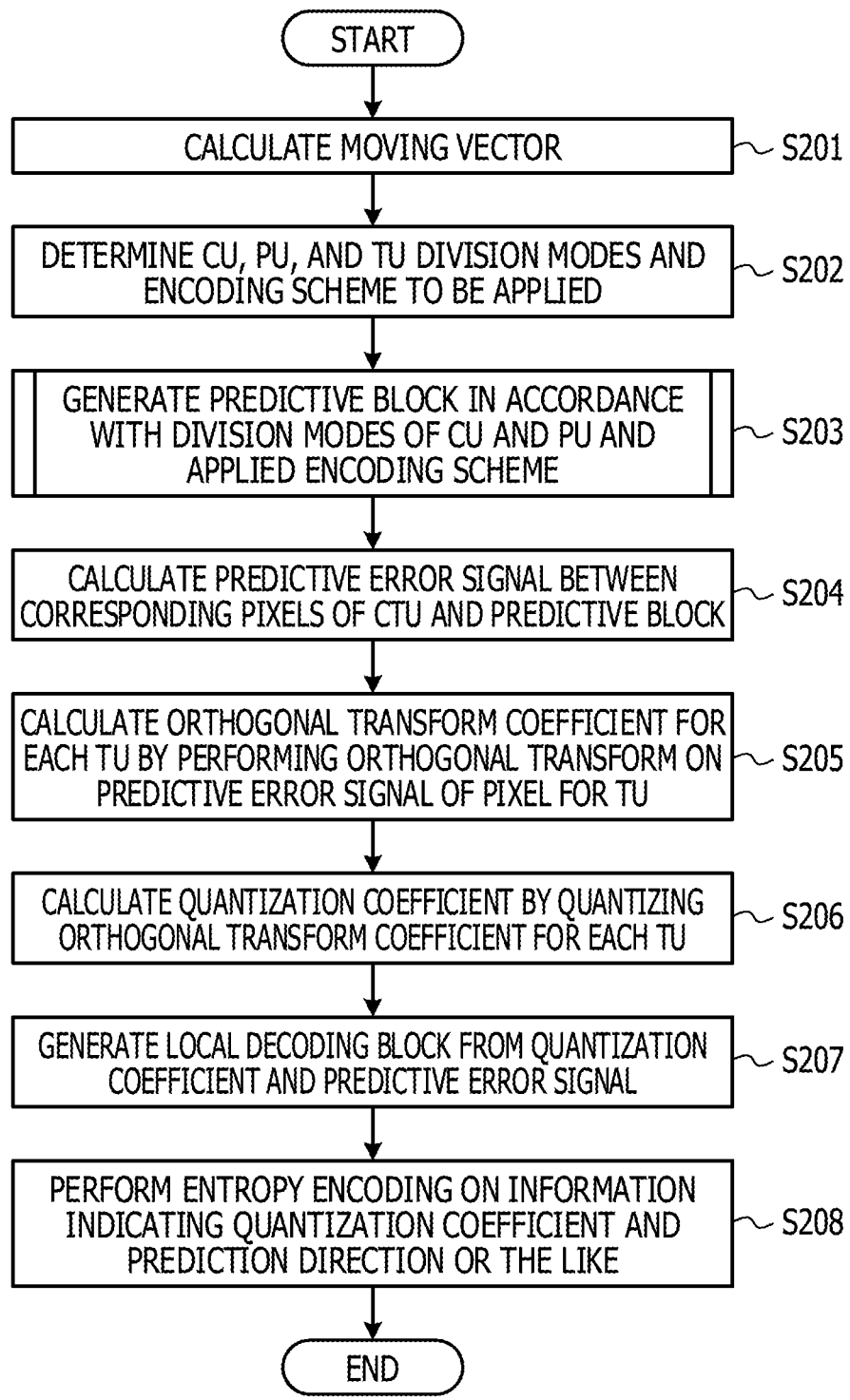
FIG. 7 is an operation flowchart illustrating a video encoding process.

FIG. 7 is an operation flowchart illustrating the video encoding process executed by the video encoding apparatus 1. The video encoding apparatus 1 executes the video encoding process, in accordance with the following operation flowchart for each of the CTUs.

The motion search unit 11 calculates a moving vector for each PU to which a coding scheme is allowed to be applied in the encoding target CTU (Step S201). In addition, the motion search unit 11 notifies the encoding mode determination unit 12 of the moving vector of each of the PUs. When an encoding target picture including the encoding target CTU is a B picture, a moving vector is calculated for each of the L0 direction and the L1 direction. In addition, when the encoding target picture is an I picture, the process of Step S201 may be omitted.

The encoding mode determination unit 12 determines the CU, the PU, and the TU division modes, a coding scheme to be applied, and a predictive mode, for the encoding target CTU (Step S202). In addition, the encoding mode determination unit 12 notifies the predictive error signal calculation unit 14 of the TU division mode while notifying the predictive block generation unit 13 of the CU and the PU division modes, the coding scheme to be applied, and the predictive mode. In addition, the encoding mode determination unit 12 stores the CU, the PU, and the TU division modes and the encoding mode to be applied in the storage unit 18.

The predictive block generation unit 13 generates a predictive block in accordance with the determined predictive mode, coding scheme to be applied, and the CU and the PU division modes (Step S203). For the CU or the PU in which the applied predictive mode is the bi-predictive mode, the predictive block generation unit 13 generates a predictive block in accordance with the operation flowchart illustrated in FIG. 6. In addition, the predictive block generation unit 13 transmits the generated predictive block to the predictive error signal calculation unit 14.

The predictive error signal calculation unit 14 calculates a predictive error signal between corresponding pixels of the encoding target CTU and the predictive block (Step S204). In addition, the predictive error signal calculation unit 14 transmits the predictive error signal for each of the pixels of the encoding target CTU to the orthogonal transform unit 15.

The orthogonal transform unit 15 calculates an orthogonal transform coefficient for each of the TUs by performing orthogonal transform on the predictive error signal of each of the pixels for the TU (Step S205). In addition, the orthogonal transform unit 15 transmits the orthogonal transform coefficient of each of the TUs to the quantization unit 16.

The quantization unit 16 calculates a quantization coefficient by quantizing the orthogonal transform coefficient of each of the TUs of the encoding target CTU (Step S206). In addition, the quantization unit 16 outputs the quantization coefficient of each of the TUs to the decoding unit 17 and the entropy encoding unit 19.

The decoding unit 17 generates a local decoding block corresponding to the encoding target CTU from the quantization coefficient for each of the TUs of the encoding target CTU (Step S207). In addition, the decoding unit 17 stores the local decoding block in the storage unit 18.

The entropy encoding unit 19 performs entropy encoding on the predictive error for the moving vector, the quantization coefficient for each of the TUs of the encoding target CTU, and the like. In addition, the entropy encoding unit 19 performs entropy encoding various syntaxes including information on a predictive direction applied to each of the PUs to each of which the pixel unit predictive mode is applied (Step S208). The entropy encoding unit 19 performs output of the obtained encoded bitstream. In addition, the video encoding apparatus 1 ends the video encoding process for the single CTU.

As described above, such a video encoding apparatus calculates the difference absolute value between corresponding pixels of the L0 predictive block and the L1 predictive block, for the encoding target block to which the bi-predictive mode has been determined to be applied. In addition, the video encoding apparatus generates a predictive block by applying the uni-predictive mode for each pixel in which the difference absolute value is the difference threshold value or more. As described above, the video encoding apparatus allows a predictive block to be generated by switching the bi-predictive mode or the uni-predictive mode for each of the pixels. Therefore, the video encoding apparatus may improve the predictive accuracy of the predictive block for the encoding target block even when a subject exists that appears merely in one of the L0 predictive block and the L1 predictive block. As a result, the video encoding apparatus may improve the encoding efficiency of the video data.

Figure 8:
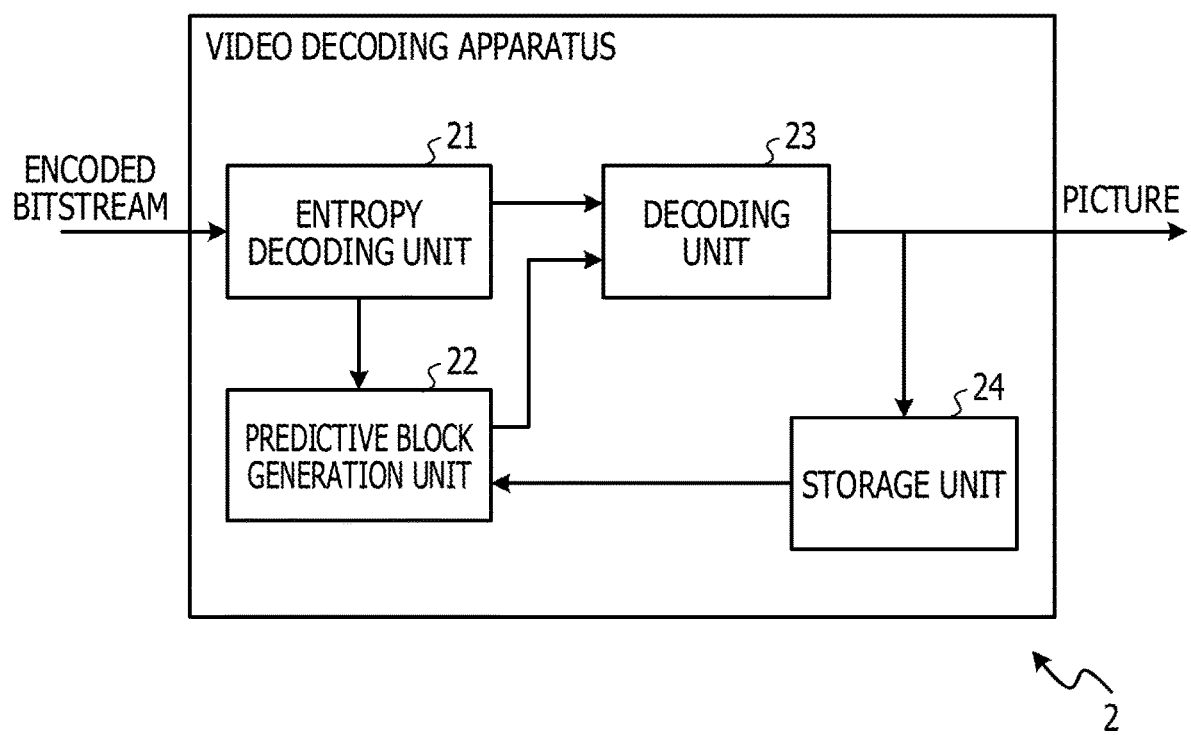
FIG. 8 is a schematic configuration diagram illustrating a video decoding apparatus.

FIG. 8 is a schematic configuration diagram illustrating a video decoding apparatus that decodes video data that has been encoded by the video encoding apparatus according to the above-described embodiment. A video decoding apparatus 2 includes an entropy decoding unit 21, a predictive block generation unit 22, a decoding unit 23, and a storage unit 24. The units included in the video decoding apparatus 2 are respectively formed as different circuits. Alternatively, the units included in the video decoding apparatus 2 may be installed in the video decoding apparatus 2 as a single integrated circuit in which circuits respectively corresponding to the units are integrated. In addition, the units included in the video decoding apparatus 2 may be function modules realized by a computer program executed on a processor included in the video decoding apparatus 2.

The video decoding apparatus 2 obtains an encoded bitstream including encoded video data, for example, through an interface circuit used to couple the video decoding apparatus 2 to a communication network. In addition, the video decoding apparatus 2 stores the encoded bitstream in a buffer memory that is not illustrated. The video decoding apparatus 2 reads encoded data from the buffer memory for each CTU, and inputs the data for the CTU to the entropy decoding unit 21.

The entropy decoding unit 21 performs entropy decoding on the data encoded for each CTU. In addition, the entropy decoding unit 21 decodes a quantization coefficient of each TU in the CTU. In addition, for each CU on which inter-predictive encoding has been performed, the entropy decoding unit 21 performs entropy decoding on a predictive error signal of a moving vector for each PU included in the CU. In addition, for each of the CUs on which the intra-predictive encoding has been performed, the entropy decoding unit 21 performs entropy decoding on a predictive mode for each of the PUs included in the CU. In addition, the entropy decoding unit 21 performs entropy decoding on various syntaxes including a syntax indicating the applied division modes, the coding scheme, and the like, and a syntax indicating a predictive direction applied to the occlusion area for a CU to which the bi-predictive mode is applied. In addition, the entropy decoding unit 21 transmits the various syntaxes and the like to the predictive block generation unit 22. In addition, the entropy decoding unit 21 transmits the quantization coefficient to the decoding unit 23.

For each of the CUs, the predictive block generation unit 22 generates a predictive block of each of the PUs included the CU, with reference to a decoded picture or a decoded area of the decoding target picture, for the decoding target CTU. At that time, it is only sufficient that the predictive block generation unit 22 generates a predictive block by executing a process similar to that of the predictive block generation unit 13 of the video encoding apparatus 1. In addition, the predictive block generation unit 22 reproduces a moving vector from information on the applied vector mode, the predictive error signal of the moving vector, and the like.

Figure 9:
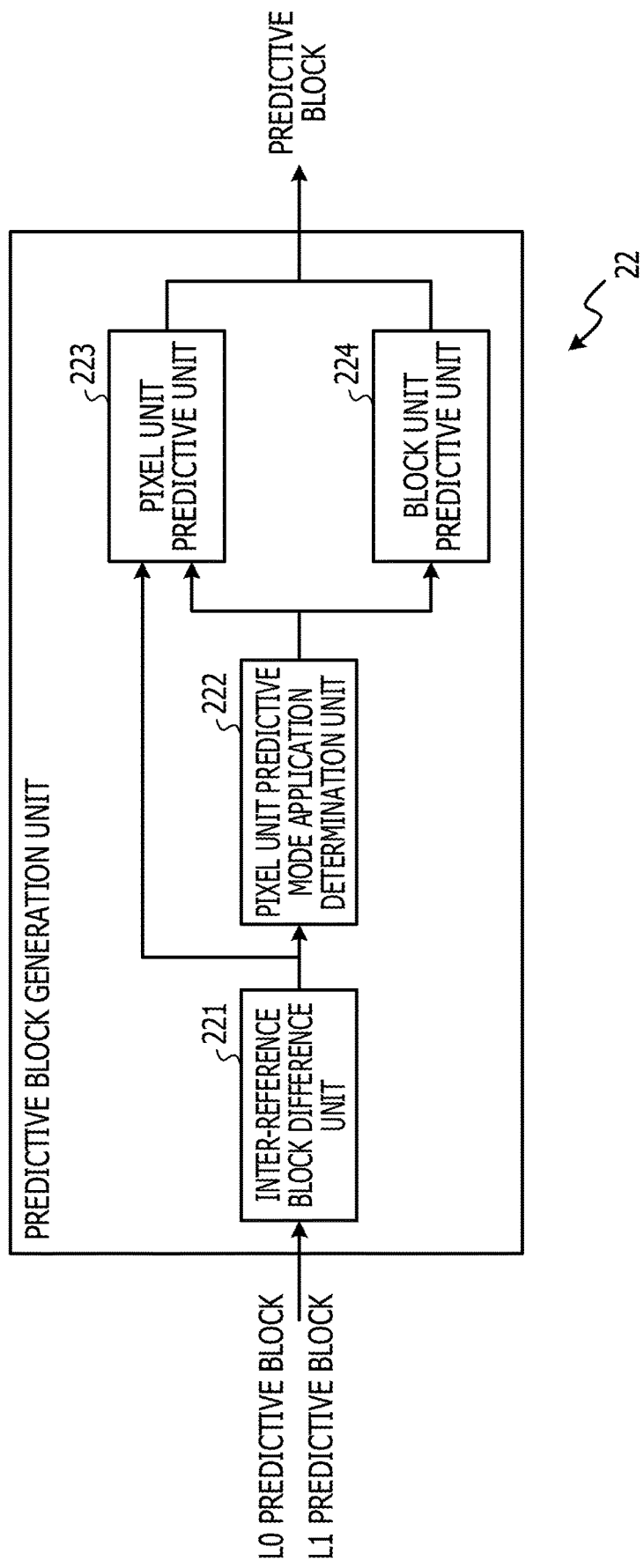
FIG. 9 is a block diagram illustrating a predictive block generation unit for a decoding target block to which the bi-predictive mode is applied.

FIG. 9 is a block diagram illustrating the predictive block generation unit 22 for a CU to which a bi-predictive mode is applied. The predictive block generation unit 22 includes an inter-reference block difference unit 221, a pixel unit predictive mode application determination unit 222, a pixel unit predictive unit 223, and a block unit predictive unit 224.

The inter-reference block difference unit 221 is an example of a difference unit, and executes a process similar to that of the inter-reference block difference unit 131 in the video encoding apparatus 1. That is, the inter-reference block difference unit 221 calculates a difference absolute value between pixel values of the corresponding pixels of the L0 predictive block and the L1 predictive block for each of the PUs in the CU to which the bi-predictive mode has been applied. In addition, the inter-reference block difference unit 221 notifies the pixel unit predictive mode application determination unit 222 and the pixel unit predictive unit 223 of the difference absolute value for each of the pixels of the PU.

The pixel unit predictive mode application determination unit 222 is an example of a determination unit, and determines whether the pixel unit predictive mode is applied for each of the PUs in the CU to which the bi-predictive mode has been applied, similar to the pixel unit predictive mode application determination unit 132 in the video encoding apparatus 1. Therefore, the pixel unit predictive mode application determination unit 222 compares the difference absolute value for each of the pixels with a difference threshold value, and obtains a pixel in which the difference absolute value is the difference threshold value or more. In addition, the pixel unit predictive mode application determination unit 222 counts an occlusion number. The pixel unit predictive mode application determination unit 222 compares the occlusion number with an occlusion threshold value, for each of the PUs. The pixel unit predictive mode application determination unit 222 determines that the pixel unit predictive mode is applied to a PU in which the occlusion number is the occlusion threshold value or more, and determines that the bi-predictive mode is applied to a PU in which the occlusion number is less than the occlusion threshold value.

When preset values are used for the difference threshold value and the occlusion threshold value, it is only sufficient that the pixel unit predictive mode application determination unit 222 uses the preset difference threshold value and occlusion threshold value. In addition, when information indicating the difference threshold value and the occlusion threshold value is included in the encoded bitstream, it is only sufficient that the pixel unit predictive mode application determination unit 222 uses the difference threshold value and the occlusion threshold value indicated by the information.

The pixel unit predictive mode application determination unit 222 notifies the pixel unit predictive unit 223 and the block unit predictive unit 224 of a determination result indicating whether the pixel unit predictive mode is allowed to be applied for each PU or each CU.

The pixel unit predictive unit 223 generates a predictive block in accordance with the pixel unit predictive mode for a PU to which the pixel unit predictive mode is applied or each PU included in a CU to which the pixel unit predictive mode is applied, similar to the pixel unit predictive unit 133 in the video encoding apparatus 1.

That is, for a pixel in which a difference absolute value between pixel values of corresponding pixels of the L0 predictive block and the L1 predictive block is less than the difference threshold value, the pixel unit predictive unit 223 calculates a value of the corresponding pixel of the predictive block based on the L0 predictive block and the L1 predictive block in accordance with the bi-predictive mode.

In addition, for the occlusion pixel, the pixel unit predictive unit 223 calculates a value of the corresponding pixel of the predictive block, based on one of the L0 predictive block and the L1 predictive block in accordance with the uni-predictive mode. In this case, for example, it is only sufficient that the pixel unit predictive unit 223 determines a predictive image to be referred to from among the L0 predictive block and the L1 predictive block with reference to information on a predictive direction referred to in the pixel unit predictive mode, on which entropy decoding has been performed.

The block unit predictive unit 224 executes a process similar to that of the block unit predictive unit 134 in the video encoding apparatus 1. That is, the block unit predictive unit 224 generates a predictive block in accordance with the bi-predictive mode for a PU to which the pixel unit predictive mode is not applied or each PU included in a CU to which the pixel unit predictive mode is not applied.

The predictive block generation unit 22 outputs the generated predictive block to the decoding unit 23.

Figure 10:
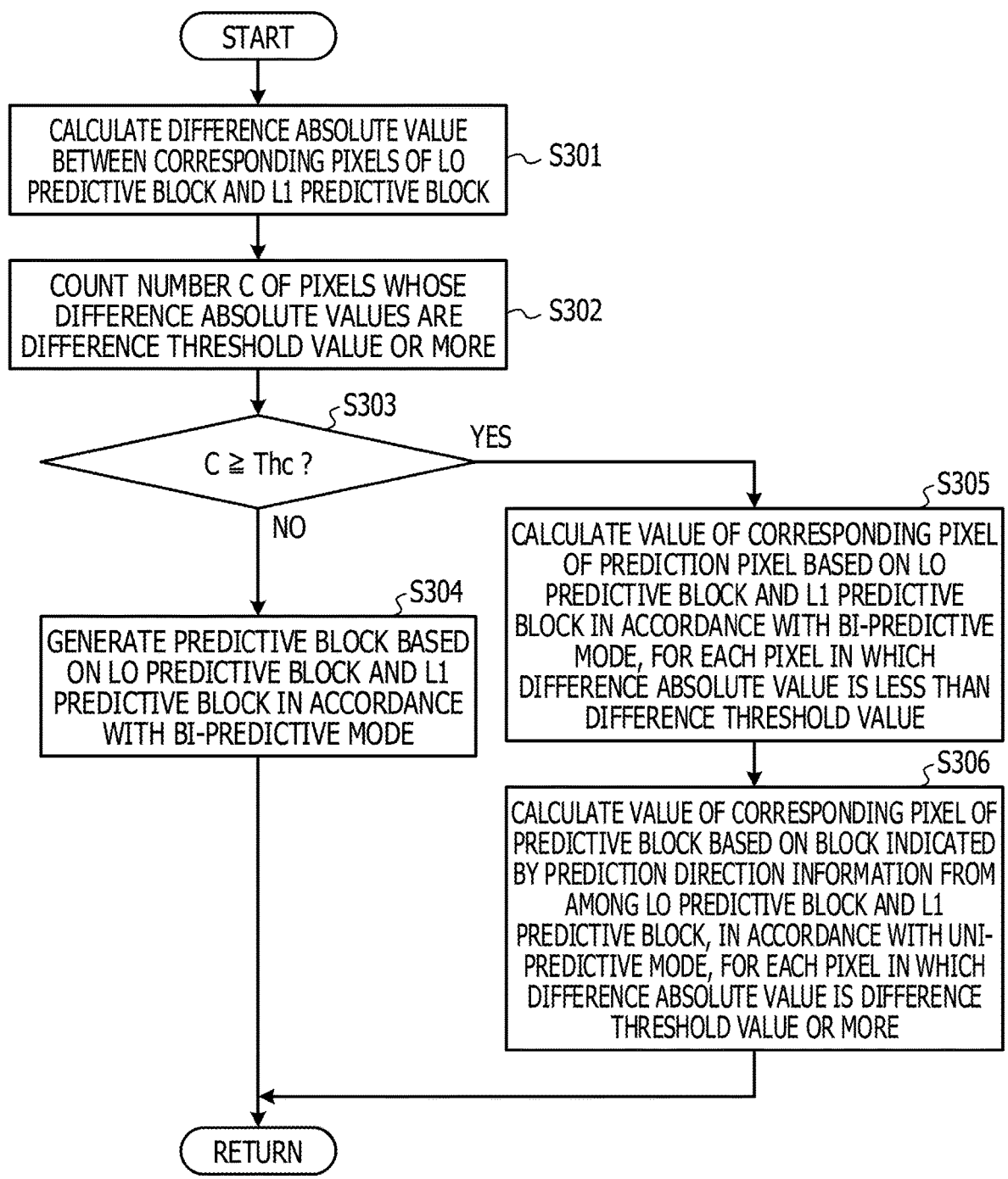
FIG. 10 is an operation flowchart illustrating predictive block generation for the decoding target block to which the bi-predictive mode is applied.

FIG. 10 is an operation flowchart illustrating predictive block generation for a decoding target block (PU or CU) to which the bi-predictive mode is applied by the predictive block generation unit 22. The predictive block generation unit 22 generates a predictive block in accordance with the following operation flowchart, for each encoding target block.

For each pixel, the inter-reference block difference unit 221 calculates a difference absolute value between pixel values of corresponding pixels of the L0 predictive block and the L1 predictive block (Step S301).

The pixel unit predictive mode application determination unit 222 compares the difference absolute value of each of the pixels with the difference threshold value, and obtains an occlusion number C by counting the number of pixels in each of which the difference absolute value is the difference threshold value or more (Step S302). In addition, the pixel unit predictive mode application determination unit 222 determines whether the occlusion number C is an occlusion threshold value Thc or more (Step S303).

When the occlusion number C is less than the occlusion threshold value Thc (Step S303-No), the block unit predictive unit 224 applies the bi-predictive mode to the whole predictive block. In addition, the block unit predictive unit 224 generates a predictive block based on the L0 predictive block and the L1 predictive block (Step S304).

In addition, when the occlusion number C is the occlusion threshold value Thc or more (Step S303—Yes), the pixel unit predictive unit 223 applies the bi-predictive mode to each pixel in which the difference absolute value is less than the difference threshold value, that is, each pixel not included in the occlusion area. In addition, the pixel unit predictive unit 223 calculates a value of the corresponding pixel of the predictive block based on the L0 predictive block and the L1 predictive block (Step S305). In addition, the pixel unit predictive unit 223 applies the uni-predictive mode to each pixel in which the difference absolute value is the difference threshold value or more, that is, each pixel included in the occlusion area. In addition, the pixel unit predictive unit 223 calculates a value of the corresponding pixel of the predictive block based on a predictive image indicated by information on a predictive direction on which entropy decoding has been performed, from among the L0 predictive block and the L1 predictive block (Step S306).

After Step S304 or Step S306, the predictive block generation unit 22 ends the predictive block generation process for the encoding target block to which the bi-predictive mode is applied. The order of the process of Step S305 and the process of Step S306 may be switched.

The decoding unit 23 performs inverse quantization by multiplying the quantization coefficient of each of the TUs, which that has been received from the entropy decoding unit 21, by a specific number corresponding to a quantization width that has been determined by a quantization parameter that had been obtained from decoded header information. By such inverse quantization, an orthogonal transform coefficient of each of the TUs is restored. After that, the decoding unit 23 executes an inverse orthogonal transform process for the orthogonal transform coefficient, for each of the TUs. A predictive error signal for each of the pixels of the whole CTU is reproduced when an inverse quantization process and the inverse orthogonal transform process are executed for the quantization coefficient of each of the TUs.

The decoding unit 23 may decode each PU by adding, to each of the pixel values of the predictive block of the PU, the reproduced predictive error signal corresponding to the pixel. In addition, the decoding unit 23 decodes the CTU by combining the decoded PUs in accordance with the encoding order. The decoding unit 23 stores the decoded CTU in the storage unit 24. In addition, the decoding unit 23 decodes the whole picture by combining the decoded CTUs in accordance with the encoding order. The decoding unit 23 stores the decoded picture in a buffer memory while storing the decoded picture in the storage unit 24. Each of the decoded pictures stored in the buffer memory is output to a display device (not illustrated) in accordance with the display order by a control unit (not illustrated).

The storage unit 24 stores temporarily the decoded CTU and the decoded picture that have been received from the decoding unit 23. In addition, the storage unit 24 supplies the CTU or the picture as a reference area to the predictive block generation unit 22. The storage unit 24 stores pictures of the specific number of sheets that have been defined in advance, and discards a picture in order of a picture the encoding of which is old when the stored data size exceeds the size corresponding to the specific number of sheets.

Figure 11:
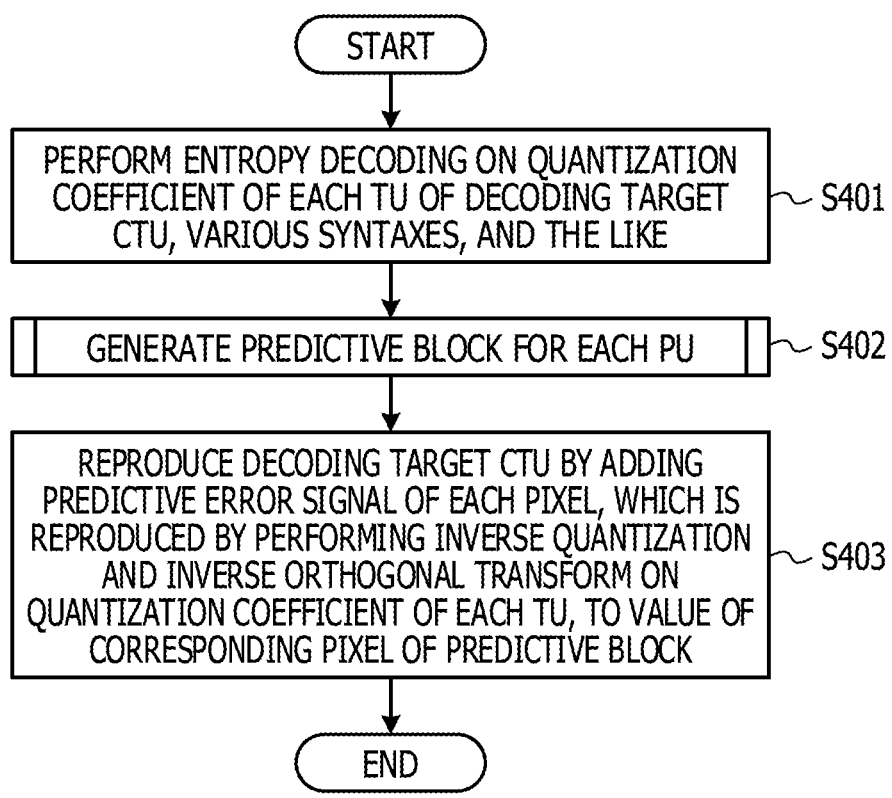
FIG. 11 is an operation flowchart illustrating a video decoding process.

FIG. 11 is an operation flowchart illustrating the video decoding process executed by the video decoding apparatus 2. The video decoding apparatus 2 executes the video decoding process illustrated in FIG. 11, for each CTU that is a decoding target. The entropy decoding unit 21 reproduces various syntaxes including information indicating a predictive direction in the pixel unit predictive mode, a quantization coefficient of each TU of the decoding target CTU, and the like, by performing entropy decoding on data encoded for the decoding target CTU (Step S401).

In addition, the predictive block generation unit 22 generates a predictive block for each of the PUs depending on a predictive mode and a predictive coding scheme that have been applied to each CU included in the decoding target CTU, with reference to the decoded picture or the decoded area of the decoding target picture (Step S402).

The decoding unit 23 performs inverse quantization by multiplying the quantization coefficient that has been received from the entropy decoding unit 21 by a specific number corresponding to a quantization width that has been determined based on a quantization parameter that had been obtained from header information included in an encoded bitstream. In addition, the decoding unit 23 reproduces a predictive error signal of the decoding target CTU by executing the inverse orthogonal transform process for an orthogonal transform signal for each of the TUs. After that, the decoding unit 23 reproduce the decoding target CTU by adding, to each pixel value of the predictive block, a reproduced predictive error signal corresponding to the pixel (Step S403). The decoding unit 23 stores the reproduced CTU in the storage unit 24. In addition, the video decoding apparatus 2 ends the video decoding process for the decoding target CTU.

As described above, such a video decoding apparatus may decode encoded video data by the video encoding apparatus according to the above-described embodiments even when a block that has been encoded by applying the pixel unit predictive mode is included in the video data.

In a modification, in each of the video encoding apparatus and the video decoding apparatus, the pixel unit predictive unit may refer to an encoded (or decoded) area around an encoding target (or decoding target) block to which the pixel unit predictive mode is applied. In addition, the pixel unit predictive unit may determine a predictive direction to be referred to in the occlusion area to which the uni-predictive mode is applied, based on the area around the encoding target (or decoding target) block.

Figure 12:
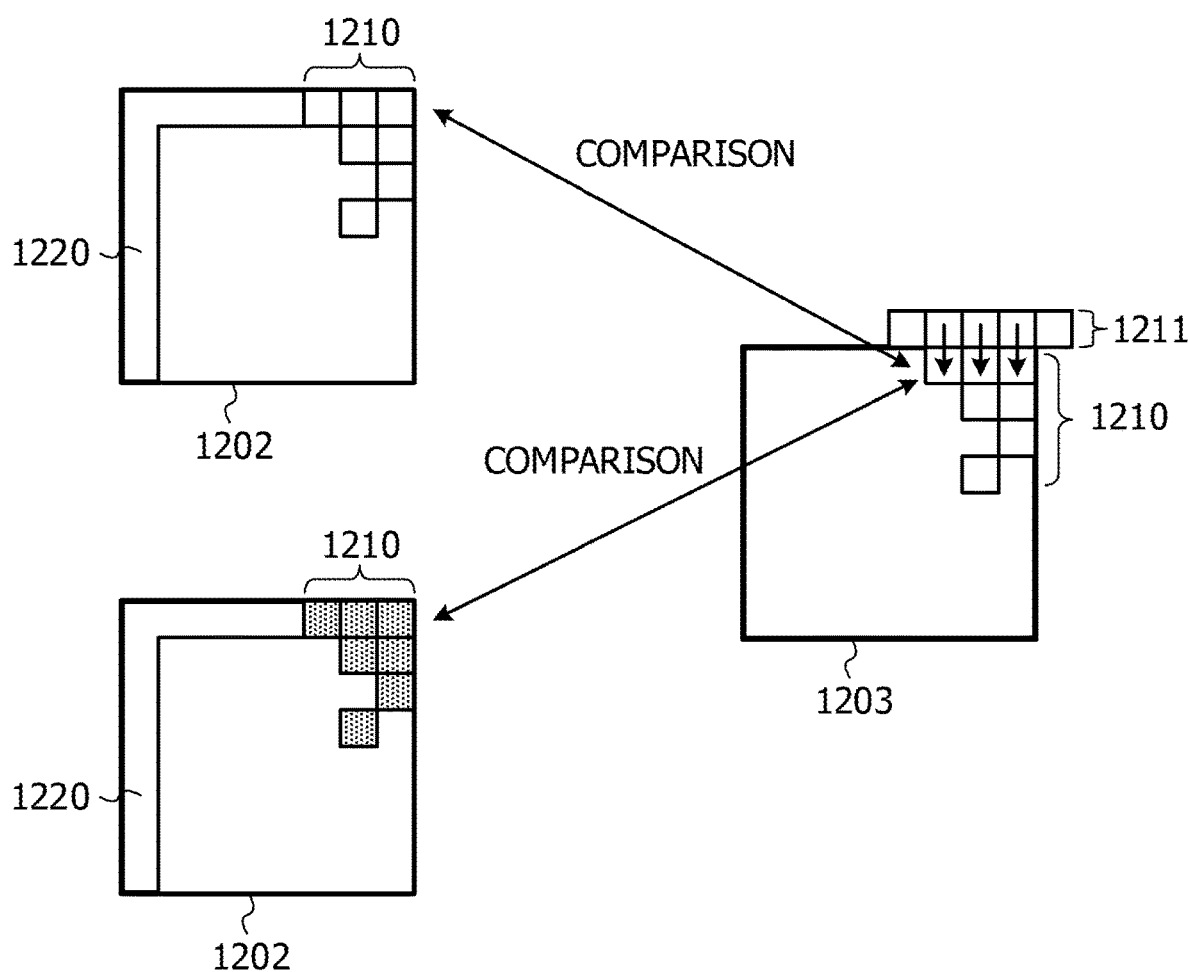
FIG. 12 is a diagram illustrating the overview of a predictive direction determination process in a modification.

FIG. 12 is a diagram illustrating the overview of a predictive direction determination process according to the modification. In this example, an occlusion area 1210 is included in the vicinity of the upper right of each of the L0 predictive block 1201 and the L1 predictive block 1202. In this case, the pixel unit predictive unit determines spatial continuity between each of the occlusion areas 1210 of the L0 predictive block 1201 and the L1 predictive block 1202, and an area 1211 adjacent to the top of an encoding (decoding) target block 1203. In addition, the pixel unit predictive unit sets a block having high spatial continuity with the area 1211, from among the L0 predictive block 1201 and the L1 predictive block 1202, as a predictive image to be referred to in the pixel unit predictive mode. This is why it is assumed that spatial continuity between the area 1211 and the occlusion area 1210 of one of the predictive blocks becomes high when an obstacle appears over the adjacent area 1211 and the occlusion area 1210 of the encoding target block 1203.

The pixel unit predictive unit generates an intra-predictive block from the encoded (or decoded) area around the encoding (decoding) target block in accordance with each predictive mode in the intra-predictive coding scheme, which is defined, for example, in HEVC in order to check spatial continuity. In addition, the pixel unit predictive unit calculates a difference absolute value sum SAD between the corresponding pixels of the occlusion areas of the Lm predictive block (m=0 or 1) and the intra-predictive block that has been generated for each of the predictive modes. The pixel unit predictive unit may set the minimum value of the difference absolute value sum SAD as a feature amount indicating the spatial continuity.

In such a modification, the video decoding apparatus may identify the predictive direction even when the video encoding apparatus causes information on the predictive direction in a case in which the pixel unit predictive mode is applied not to be included in the encoded bitstream. Therefore, the video encoding apparatus and the video decoding apparatus according to such a modification may improve the encoding efficiency.

The above-described modification may be applied to a case in which a pixel column (pixel column 1220 in FIG. 12) at the left end or top of the encoding (decoding) target block, which is adjacent to the encoded (decoded) area, and the occlusion area overlap. In addition, the pixel unit predictive unit may calculate a SAD for pixels included in the occlusion area and included in the pixel column at the left end or the top of the encoding (decoding) target block in order to check spatial continuity. In addition, in other cases, similar to the above-described embodiment, information on the predictive direction may be included in the encoded bitstream.

In addition, in another modification, in the video encoding apparatus, the pixel unit predictive mode may be applied for the encoding target block to which the bi-predictive mode is applied, regardless of an occlusion number. In this case, in the video encoding apparatus, the pixel unit predictive mode application determination unit 132 may be omitted. Similar to the video encoding apparatus, even in the video decoding apparatus, the pixel unit predictive mode application determination unit 222 may be omitted.

Alternatively, a flag indicating whether the pixel unit predictive mode is applied may be included in a syntax of a CU or a PU. In this case, it is only sufficient that the video encoding apparatus and the video decoding apparatus apply the pixel unit predictive mode for the CU or the PU to which the flag indicates that the pixel unit predictive mode is applied. It is only sufficient that the video encoding apparatus determines a value of the flag in accordance with presetting in the video encoding apparatus or an operation by the user.

In addition, in another modification, the encoding mode determination unit 12 of the video encoding apparatus may generate a predictive block when the pixel unit predictive mode is applied, by executing a process similar to that of the predictive block generation unit 13, for the encoding target CTU of a B picture, for each of the division modes. In addition, the encoding mode determination unit 12 may calculate an encoding cost when the pixel unit predictive mode is applied, based on the predictive block. In addition, the encoding mode determination unit 12 may determine whether the pixel unit predictive mode is allowed to be applied, in addition to the applied coding scheme, and the predictive mode, and the CU, the PU, and the TU division modes for the encoding target CTU so that the encoding cost becomes minimum. Even in this case, the pixel unit predictive mode application determination unit 132 may be omitted.

As described above, the video encoding apparatus may improve the encoding efficiency by determining whether the pixel unit predictive mode is allowed to be applied, in addition to the division modes, the applied coding scheme, and the predictive mode, based on the encoding cost.

FIG. 13 is a configuration diagram illustrating a computer that operates as the video encoding apparatus or the video decoding apparatus according to the embodiments or the modifications when a computer program operates that realizes a function of each of the units of the operating video encoding apparatus or video decoding apparatus.

A computer 100 includes a user interface (UI) unit 101, a communication interface unit 102, a storage unit 103, a storage medium access device 104, and a processor 105. The processor 105 is coupled to the UI unit 101, the communication interface unit 102, the storage unit 103, and the storage medium access device 104, for example, through a bus.

The UI unit 101 includes, for example, input devices such as a keyboard and a mouse and a display device such as a liquid crystal display. Alternatively, the UI unit 101 may include a device such as a touch panel display in which the input device and the display device are integrated. In addition, the UI unit 101 outputs an operation signal used to select video data to be encoded or encoded video data to be decoded, to the processor 105, for example, in response to an operation of the user. In addition, the UI unit 101 may display the decoded video data that has been received from the processor 105.

The communication interface unit 102 may include a communication interface used to couple the computer 100 to a device that generates video data, for example, a video camera, and a control circuit of the communication interface. It may be assumed that such a communication interface is, for example, a universal serial bus (USB).

In addition, the communication interface unit 102 may include a communication interface used to couple the computer 100 to a communication network that conforms to a communication standard such as Ethernet (registered trademark), and a control circuit of the communication interface.

In this case, the communication interface unit 102 obtains an encoded bitstream including video data to be encoded or encoded video data to be decoded, from another device coupled to the communication network, and transmits these pieces of data to the processor 105. In addition, the communication interface unit 102 may output the encoded video data or the decoded video data that have been received from the processor 105, to another device through the communication network.

The storage unit 103 includes, for example, a readable and writable semiconductor memory and a read-only semiconductor memory. In addition, the storage unit 103 stores a computer program used to execute the video encoding process or the video decoding process, which is executed on the processor 105, and data generated in the course of the process or data generated at a result of the process.

The storage medium access device 104 is, for example, a device that accesses a storage medium 106 such as a magnetic disk, a semiconductor memory card, and an optical storage medium. The storage medium access device 104 reads, for example, a computer program for the video encoding process or the video decoding process, which is stored in the storage medium 106 and is to be executed on the processor 105, and transmits the computer program to the processor 105.

The processor 105 generates encoded video data by executing the computer program for the video encoding process in the above-described embodiments or modifications. In addition, the processor 105 stores the generated encoded video data in the storage unit 103, or outputs the generated encoded video data to another device through the communication interface unit 102. In addition, the processor 105 decodes the encoded video data by executing the computer program for the video decoding process in the above-described embodiments or modifications. In addition, the processor 105 stores the decoded video data in the storage unit 103 and displays the decoded video data on the UI unit 101, or outputs the decoded video data to another device through the communication interface unit 102.

A computer program by which a function of each of the units of the video encoding apparatus 1 is allowed to be executed on the processor may be provided so as to be recorded in a computer-readable medium. Similarly, a computer program by which a function of each of the units of the video decoding apparatus 2 is allowed to be executed on the processor may be provided so as to be recorded in a computer-readable medium. However, carrier waves are not included in such a recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for a video encoding process that includes encoding an encoding target block from among a plurality of blocks obtained by performing division of an encoding target picture included in video data, the apparatus comprising:
    a memory; and
    a processor coupled to the memory and configured to
        execute a difference process that includes calculating a difference value between a corresponding first pixel of a first reference block and a corresponding second pixel of a second reference block, the first reference block being referred to for the encoding target block and being on a first encoded reference picture in a first direction from the encoding target picture, the second reference block being referred to for the encoding target block and being on a second encoded reference picture in a second direction from the encoding target picture;
        execute a predictive process that includes
            generating a predictive block by calculating a value of a corresponding pixel of the predictive block in accordance with the bi-predictive mode when an absolute value of the difference value is less than a threshold value, and
            generating the predictive block by calculating the value of the corresponding pixel of the predictive block in accordance with a uni-predictive mode when the absolute value of the difference value is equal to or greater than the threshold value;
        execute an encoding process that includes
            calculating a predictive error between the corresponding pixels of the encoding target block and the predictive block,
            encoding the predictive error, and
            inserting information regarding the threshold value into data obtained by the encoding of the predictive error; and
        execute a determination process that includes determining that the predictive block is generated based on the first reference block and the second reference block in accordance with the bi-predictive mode when the number of pixels of the encoding target block whose absolute values of the difference values are equal to or greater than the threshold value is less than a specific number, and determining that the predictive process generates the predictive block when the number of pixels is equal to or greater than the specific number,
    wherein the encoding process includes inserting the specific number into data obtained by encoding the video data.

2. The apparatus according to claim 1, wherein
the predictive process includes obtaining a value of a pixel of the predictive block, which corresponds to each of the pixels in which the absolute value of the difference value is equal to or greater than the threshold value, based on one of the first reference block and the second reference block, which has a smaller statistics value of differences with respect to the value of the corresponding pixel of the encoding target block for the pixels in each of which the absolute value of the difference value is equal to or greater than the threshold value.

3. The apparatus according to claim 1, wherein
the encoding process includes inserting predictive direction information, which indicates one of the first reference block and the second reference block to be referred to for each of the pixels in which the absolute value of the difference value is equal to or greater than the threshold value, into data obtained by encoding the video data.

4. The apparatus according to claim 1, wherein
the predictive process includes obtaining a value of a pixel of the predictive block, which corresponds to each of the pixels in which the absolute value of the difference value is equal to or greater than the threshold value, based on one of the first reference block and the second reference block which has higher spatial continuity with an encoded area adjacent to the encoding target block.

5. A non-transitory computer-readable storage medium for storing a program regarding a video encoding process that includes encoding an encoding target block from among a plurality of blocks obtained by performing division of an encoding target picture included in video data, the program causing a processor to execute a process, the process comprising:
    executing a difference process that includes calculating a difference value between a corresponding first pixel of a first reference block and a corresponding second pixel of a second reference block, the first reference block being referred to for the encoding target block and being on a first encoded reference picture in a first direction from the encoding target picture, the second reference block being referred to for the encoding target block and being on a second encoded reference picture in a second direction from the encoding target picture;
    executing a predictive process that includes
        generating a predictive block by calculating a value of a corresponding pixel of the predictive block in accordance with the bi-predictive mode when an absolute value of the difference value is less than a threshold value, and
        generating the predictive block by calculating the value of the corresponding pixel of the predictive block in accordance with a uni-predictive mode when the absolute value of the difference value is equal to or greater than the threshold value;

executing an encoding process that includes
calculating a predictive error between the corresponding pixels of the encoding target block and the predictive block,
encoding the predictive error, and
inserting information regarding the threshold value into data obtained by the encoding of the predictive error; and
executing a determination process that includes determining that the predictive block is generated based on the first reference block and the second reference block in accordance with the bi-predictive mode when the number of pixels of the encoding target block whose absolute values of the difference values are equal to or greater than the threshold value is less than a specific number, and determining that the predictive process generates the predictive block when the number of pixels is equal to or greater than the specific number,
wherein the encoding process includes inserting the specific number into data obtained by encoding the video data.

6. An apparatus for a video decoding process that includes decoding a decoding target block from among a plurality of blocks obtained by performing division of a decoding target picture included in encoded video data, the apparatus comprising:
a memory; and
a processor coupled to the memory and configured to
execute a difference process that includes calculating a difference value between a corresponding first pixel of a first reference block and a corresponding second pixel of a second reference block, the first reference block being referred to for the decoding target block and being on a first decoded reference picture in a first direction from the decoding target picture, the second reference block being referred to for the decoding target block and being on the second decoded reference picture in a second direction from the encoding target picture,
execute a predictive process that includes
generating a predictive block by calculating a value of a corresponding pixel of the predictive block in accordance with the bi-predictive mode when an absolute value of the difference value is less than a threshold value, and
generating the predictive block by calculating the value of the corresponding pixel of the predictive block in accordance with a uni-predictive mode when the absolute value of the difference value is equals to or greater than the threshold value,
execute a decoding process that includes decoding the decoding target block by adding the value of the corresponding pixel of the predictive block to a predictive error between corresponding pixels of the predictive block and the decoding target block included in the encoded video data, and
execute a determination process that includes determining that the predictive block is generated based on the first reference block and the second reference block in accordance with the bi-predictive mode when the number of pixels of the decoding target block whose absolute values of the difference values are the threshold value or more is less than a specific number, and determining that the predictive process generates the predictive block when the number of pixels is equal to or greater than the specific number,
wherein the specific number is included in the encoded video data,
wherein the encoded video data includes the threshold value, and
wherein the threshold value is obtained from the encode video data.

7. The apparatus according to claim 6, wherein
the encoded video data further includes predictive direction information indicating a block to be referred to from among the first reference block and the second reference block, for the decoding target block, and
the predictive process includes determining the block to be referred to from among the first reference block and the second reference block for each of the pixels in which the absolute value of the difference value is equal to or greater than the threshold value, with reference to the predictive direction information.

8. A non-transitory computer-readable storage medium for storing a program regarding a video decoding process that includes decoding a decoding target block from among a plurality of blocks obtained by performing division of a decoding target picture included in encoded video data, the program causing a processor to execute a process, the process comprising:
executing a difference processing that includes calculating a difference value between a corresponding first pixel of a first reference block and a corresponding second pixel of a second reference block, the first reference block being referred to for the decoding target block and being on a first decoded reference picture in a first direction from the decoding target picture, the second reference block being referred to for the decoding target block and being on the second decoded reference picture in a second direction from the encoding target picture;
executing a predictive processing that includes
generating a predictive block by calculating a value of a corresponding pixel of the predictive block in accordance with the bi-predictive mode when an absolute value of the difference value is less than a threshold value, and
generating the predictive block by calculating the value of the corresponding pixel of the predictive block in accordance with a uni-predictive mode when the absolute value of the difference value is equals to or greater than the threshold value;
executing a decoding processing that includes decoding the decoding target block by adding the value of the corresponding pixel of the predictive block to a predictive error between corresponding pixels of the predictive block and the decoding target block included in the encoded video data; and
executing a determination process that includes determining that the predictive block is generated based on the first reference block and the second reference block in accordance with the bi-predictive mode when the number of pixels of the encoding target block whose absolute values of the difference values are equal to or greater than the threshold value is less than a specific number, and determining that the predictive process generates the predictive block when the number of pixels is equal to or greater than the specific number,
wherein the specific number is included in the encoded video data,
wherein the encoded video data includes the threshold value, and
wherein the threshold value is obtained from the encode video data.

* * * * *